(12) United States Patent
Gollier et al.

(10) Patent No.: US 9,880,328 B2
(45) Date of Patent: Jan. 30, 2018

(54) TRANSPARENT DIFFUSERS FOR LIGHTGUIDES AND LUMINAIRES

(71) Applicant: CORNING INCORPORATED, Corning, NY (US)

(72) Inventors: Jacques Gollier, Painted Post, NY (US); Shandon Dee Hart, Corning, NY (US); Karl William Koch, III, Elmira, NY (US); James Andrew West, Painted Post, NY (US); Ellen Marie Kosik Williams, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 362 days.

(21) Appl. No.: 14/563,228

(22) Filed: Dec. 8, 2014

(65) Prior Publication Data
US 2015/0167921 A1    Jun. 18, 2015

Related U.S. Application Data

(60) Provisional application No. 61/915,327, filed on Dec. 12, 2013.

(51) Int. Cl.
G02B 5/02       (2006.01)
F21Y 115/30     (2016.01)
F21Y 115/10     (2016.01)

(52) U.S. Cl.
CPC ......... *G02B 5/0278* (2013.01); *G02B 5/0215* (2013.01); *G02B 5/0221* (2013.01); *G02B 5/0226* (2013.01); *G02B 5/0263* (2013.01); *F21Y 2115/10* (2016.08); *F21Y 2115/30* (2016.08)

(58) Field of Classification Search
None
See application file for complete search history.

(56) References Cited

U.S. PATENT DOCUMENTS

| 818,289 A | 4/1906 | Randall |
| 6,117,508 A | 9/2000 | Parsonage et al. |
| 7,480,432 B2 | 1/2009 | Grzybowski et al. |
| 7,505,650 B1 | 3/2009 | Grzybowski et al. |

(Continued)

FOREIGN PATENT DOCUMENTS

| JP | 2006-145587 | 6/2006 |
| JP | 04896368 | 1/2012 |

(Continued)

OTHER PUBLICATIONS

Gliemann, et al., "Nanostructure formation in polymer thin films influenced by humidity," Surface and Interface Analysis 39, No. 1 (2007).

(Continued)

*Primary Examiner* — Darryl J Collins
*Assistant Examiner* — Journey Sumlar
(74) *Attorney, Agent, or Firm* — Payal A. Patel

(57) ABSTRACT

A light-transmitting structure comprising a substrate having a plurality of regions where at least two of the plurality of regions have different refractive indices, an optical path length of light transmitted from a first light source through the plurality of regions is substantially constant, and where light transmitted from a second light source into the substrate is scattered by at least one of the plurality of regions.

22 Claims, 23 Drawing Sheets

(56) References Cited

U.S. PATENT DOCUMENTS

| | | |
|---|---|---|
| 7,751,121 B2 | 7/2010 | Nagahama et al. |
| 8,182,899 B2 | 5/2012 | Nagahama et al. |
| 8,446,675 B1 | 5/2013 | Wang et al. |
| 9,366,785 B2 | 6/2016 | Minoura et al. |
| 2003/0117707 A1* | 6/2003 | Uchida ............... G02B 5/0242 359/493.01 |
| 2006/0187377 A1* | 8/2006 | You ...................... G02B 3/0056 349/64 |
| 2008/0057228 A1 | 3/2008 | Horie et al. |
| 2008/0247045 A1 | 10/2008 | Suzuki et al. |
| 2008/0297908 A1* | 12/2008 | Adachi ............... G02B 3/0056 359/599 |
| 2010/0039708 A1 | 2/2010 | Suzuki et al. |
| 2010/0245714 A1 | 9/2010 | Watanabe |
| 2011/0062849 A1 | 3/2011 | Carlson et al. |
| 2012/0218640 A1 | 8/2012 | Gollier et al. |
| 2012/0300304 A1 | 11/2012 | Gollier et al. |
| 2015/0331149 A1 | 11/2015 | Bookbinder et al. |

FOREIGN PATENT DOCUMENTS

| | | |
|---|---|---|
| JP | 04888392 | 2/2012 |
| WO | WO11/005265 | 1/2011 |
| WO | WO14/011328 | 1/2014 |

OTHER PUBLICATIONS

Silviera, et al., "Phase separation in PMMA/silica sol-gel systems," *Polymer* 36, No. 7 (1995): 1425-1434.

Huckaby and Cairns, "Quantifying sparkle of anti-glare surfaces", Paper 36.2, *Proceedings of the Society for Information Display—Display Week 2009*, San Antonio, Texas.

International Search Report and Written Opinion, dated Mar. 20, 2015, pp. 1-12, International Application No. PCT/US2014/069482, International filing date Dec. 10, 2014.

* cited by examiner

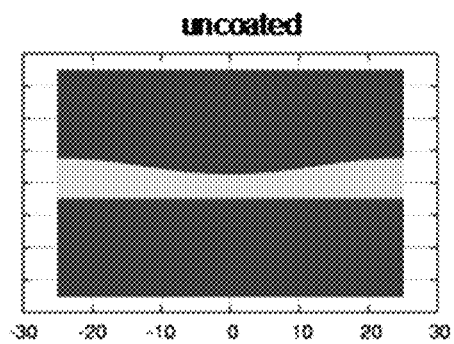
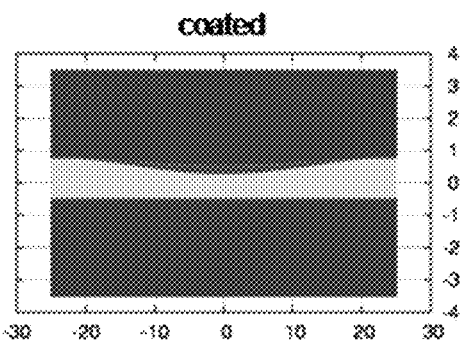
FIG. 10A          FIG. 10B
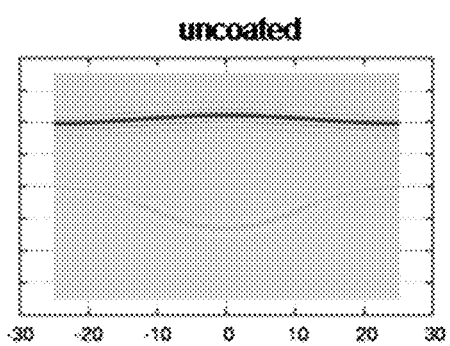
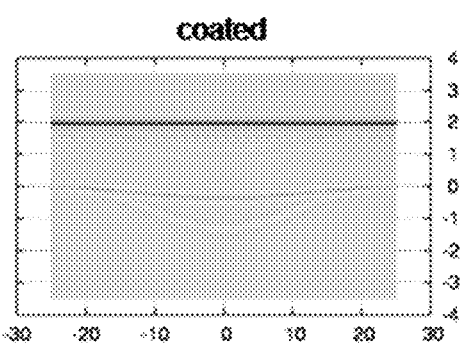
FIG. 11A          FIG. 11B

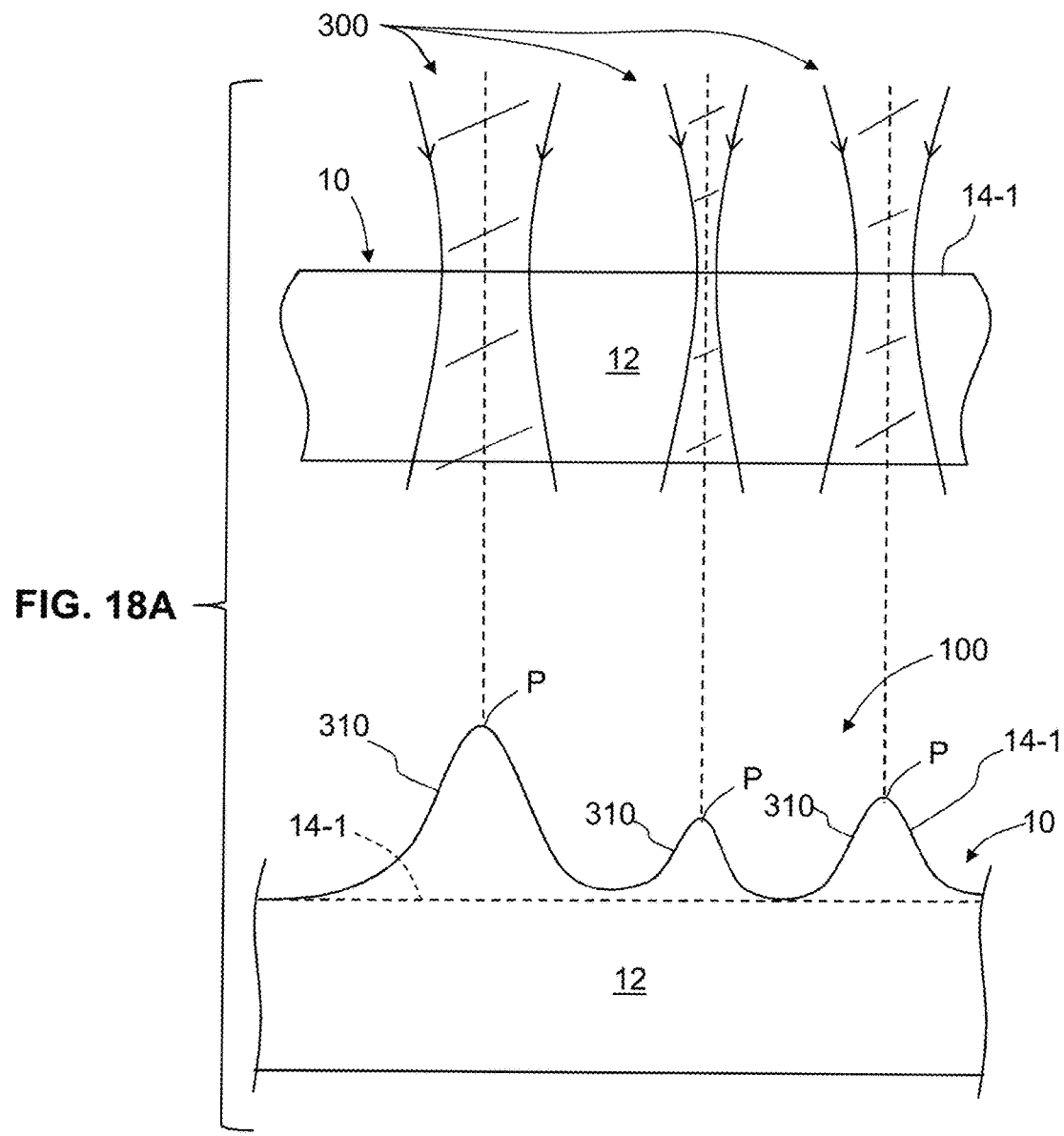

From image forming system

To the viewer eyes

TRANSPARENT DIFFUSERS FOR LIGHTGUIDES AND LUMINAIRES

CROSS-REFERENCE TO RELATED APPLICATIONS

This application claims the benefit of priority under 35 U.S.C. §119 of U.S. Provisional Application Ser. No. 61/915,327 filed on Dec. 12, 2013, the content of which is relied upon and incorporated herein by reference in its entirety.

BACKGROUND

There are numerous devices, applications and situations in which a user may view an object through a transparent medium. For example, cell phones, computer displays, televisions and appliances can employ a display having a transparent medium through which displayed information or a picture can be viewed. In similar fashion, windows, windshields, glass for covering photographs and other artwork, aquariums, and the like can also involve viewing an object through a transparent medium.

Common problems can arise when viewing an object through a transparent medium including glare and optical distortion. Glare is generally the specular reflection of ambient light on a viewer side of a transparent medium from one or more surfaces of the transparent medium. Glare travels an optical path extending from the source of the ambient light to the surface of the transparent medium and then to the viewer with the angle of incidence being substantially the same as the angle of reflection. Light from an object, on the other hand travels from the object through the transparent medium to the viewer. Glare makes it difficult to view an object through the transparent medium when the optical paths of the glare and object substantially overlap in the region between the transparent medium and viewer.

Conventional anti-glare surfaces are applied to the viewer-side surface of the transparent medium to avoid or reduce glare. Such surfaces are utilized to scatter reflected light over a certain angle. Conventional methods have also been attempted to create transparent light sources such as backlights for transparent liquid crystal displays or other applications. These methods, however, fail to adequately address scattering and other optical effects through a transparent medium with one or more light sources, e.g., the environment and a backlight or other input signals. Thus, there is a need in the industry to provide a method and device for transparent light sources such as a transparent diffuser.

SUMMARY

The embodiments disclosed herein generally relate to a transparent diffuser that can be configured with a first light source, e.g., a first edge light source or a first front light source, such that light from the first source is scattered from the transparent diffuser structure to create a distributed or diffuse light source. The first light source, however, is also highly transparent to external ambient transmitted light (a second light source independent of the first light source) such as, by way of example, scenery through a window or from an external environment. Exemplary first light sources can include, but are not limited to, light emitting diodes (LEDs), an array or arrays of LEDs, or other light sources utilized for signal or source inputs into a transparent medium.

An exemplary embodiment can scatter, that is, cause deviation from specular ray angles by more than about 1 degree or more than about 10 degrees, more than 1%, more than 5%, more than 10%, or more than 20% of light that is reflected from the structure at a glancing angle or injected into waveguide modes of the structure (as in an edge-lit waveguide). Exemplary transparent diffuser structures can result in external ambient transmitted rays having one or more of high optical transmission, high optical clarity in transmission, low optical transmission haze, or a low percentage of transmitted light that is scattered (e.g., less than 50%, less than 20%, less than 10%, less than 5%, or less than 1% of transmitted light scattered into angles greater than about 1 degree or about 0.1 degrees). Such exemplary optical transmission metrics are vastly improved over conventional methods of light scattering. Further embodiments can provide a transparent backlight or luminaire which acts as a distributed light source and can provide such improved optical transmission metrics. Surfaces of the exemplary transparent medium can be rough or smooth depending on specific application needs and the respective device or article can emit light towards a particular major direction or illumination area as desired.

It is to be understood that both the foregoing general description and the following detailed description present embodiments of the present disclosure, and are intended to provide an overview or framework for understanding the nature and character of the claimed subject matter. The accompanying drawings are included to provide a further understanding of the present disclosure, and are incorporated into and constitute a part of this specification. The drawings illustrate various embodiments and together with the description serve to explain the principles and operations of the claimed subject matter.

BRIEF DESCRIPTION OF THE DRAWINGS

For the purposes of illustration, there are forms shown in the drawings that are presently preferred, it being understood, however, that the embodiments disclosed and discussed herein are not limited to the precise arrangements and instrumentalities shown.

FIGS. 10A and 10B are models of an exemplary transparent diffuser having a rough surface profile.

FIGS. 11A and 11B are finite-difference time-domain (FDTD) simulations to account for optical effects in the embodiments depicted in FIGS. 10A and 10B.

FIG. 18A is a cross-sectional view of an exemplary transparent medium illustrating another embodiment of fabricating a structure by forming glass bumps on the surface of the transparent medium using localized heating with a pulsed laser.

DETAILED DESCRIPTION

Figure 1A:
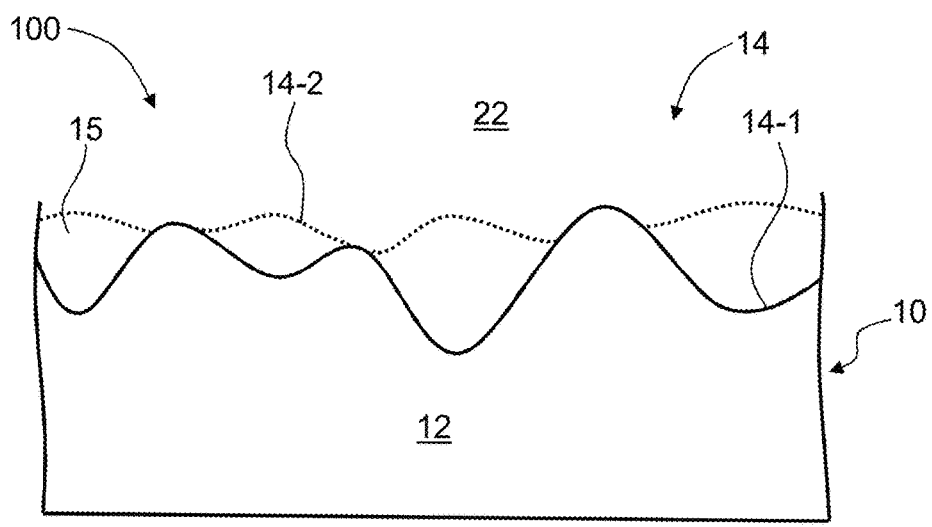
FIG. 1A is a plot illustrating an exemplary transparent structure.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other.

Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified.

The following description of the present disclosure is provided as an enabling teaching thereof and its best, currently-known embodiment. Those skilled in the art will recognize that many changes can be made to the embodiment described herein while still obtaining the beneficial results of the present disclosure. It will also be apparent that some of the desired benefits of the present disclosure can be obtained by selecting some of the features of the present disclosure without utilizing other features. Accordingly, those of ordinary skill in the art will recognize that many modifications and adaptations of the present disclosure are possible and can even be desirable in certain circumstances and are part of the present disclosure. Thus, the following description is provided as illustrative of the principles of the present disclosure and not in limitation thereof.

Those skilled in the art will appreciate that many modifications to the exemplary embodiments described herein are possible without departing from the spirit and scope of the present disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the foregoing description of exemplary or illustrative embodiments is provided for the purpose of illustrating the principles of the present disclosure and not in limitation thereof and can include modification thereto and permutations thereof.

The term "transparent medium" means a medium that is substantially transparent to a given wavelength of light. Additionally, an anti-glare (AG) surface differs from an anti-reflection (AR) surface. For example, instead of reducing the magnitude of the reflections, an AG surface keeps substantially the same magnitude of reflection but scrambles the information content of the reflected image. This can be accomplished by the creation of a slightly roughened surface that redistributes the specular reflection over a broader range of angles. This can produce a matte finish on the treated surface and may reduce image contrast under ambient lighting. Fingerprints and surface contamination are not as visible on AG surfaces as they are on non-AG surfaces, and there is no color imparted to the transmitted light and no problem with angular dependence of the reflection spectrum. The AG surfaces described herein can allow for a reduced optical distortion (or substantially no optical distortion) when an object is viewed through the transparent medium that includes the AG surface.

AR coatings can be used in connection with distortion-reducing anti-glare (DRAG) structures disclosed herein or otherwise. Exemplary AR coatings can be deposited in such a way that optical reflections from the interfaces sum destructively to substantially cancel reflections that would be seen by a viewer. AR coatings can also include nano-structured "moth-eye" surfaces made from sub-wavelength surface elements that do not substantially modify the optical path of reflected light, thus, the angle of incidence can be substantially the same as the angle of reflection with AR coatings.

Such AR coatings can be a single, uniform layer of a prescribed refractive index and thickness, a gradient index layer, a nanostructured layer, a nanoporous layer, or multiple layers and can be deposited directly on the front element of a substrate, a display, etc. or can be added as a laminated premade film. AR coatings can greatly reduce front surface reflections and do not impact the quality of a transmitted image. Exemplary AR coatings or surfaces of any type can be combined with the AG surfaces of the present disclosure.

Exemplary transparent mediums (i.e., window, display, etc.) can include areas ranging from less than 4 cm², greater than 4 cm², in some embodiments>25 cm², in other embodiments>100 cm², and in yet other embodiments>1 m² or more. A transparent medium can include objects made of glass, glass-ceramic and/or polymers. A transparent medium used in the visible wavelength of light (400-700 nm) can be important for a human observer or user; however, exemplary transparent mediums can be used at other wavelengths including the UV and IR wavelengths which may be important for instruments (e.g., cameras or imaging systems) employed at such wavelengths.

"Optical distortion" means any deviation of light rays (or wavefronts) arising from an object from an ideal optical path (or in the case of wavefronts, ideal shape) associated with forming an ideal image of the object where the deviation arises from phase errors reducing the quality of the image. Conventional AG surfaces do not make an accommodation for optical distortion and the resulting image appears distorted. Methods of quantifying optical distortion are disclosed in co-pending international application number PCT/US13/43682, filed May 31, 2013, entitled "Anti-Glare and Anti-Sparkle Transparent Structures with Reduced Optical Distortion," the entirety of which is incorporated herein by reference.

The structures, transparent mediums, articles, diffusers, substrates, etc. disclosed herein can provide a wide range of applications, including front surfaces of or buried interfaces within any display, protective covers for light-emitting displays of any size, touch screens, touch-sensitive surfaces, liquid-crystal displays (LCDs), organic light-emitting diodes (OLEDs), heads-up displays (HUDs), aquariums, laser based reflective heads-up displays, wearable displays, head mounted or mountable displays (HMDs), windows (for vehicles, housings, buildings, appliances, display cases, picture frames, freezers, refrigerators etc.), vehicle dashboards, vehicle visors, vehicle hoods, vehicle doors, sunglasses, or a glasses-based display, and generally for any application where an observer or optical system can view a scene or object through a transparent medium and where a second light source, e.g., ambient light, is present on the side where an observer, etc. resides. It should be noted that the terms structure(s), medium(s), article(s), diffuser(s), and/or substrate(s) can be utilized interchangeably in this disclosure and such use should not limit the scope of the claims appended herewith.

Thus, some embodiments of the present disclosure are generally directed to transparent diffusers that can be configured with a first light source, e.g., a first edge light source or a first front light source, such that light from the first source is scattered from the transparent diffuser structure to create a distributed or diffuse light source. The first light source, however, can be transparent to external ambient transmitted light (a second light source independent of the first light source) such as, by way of example, scenery through a window or from an external environment. Exemplary first light sources can include, but are not limited to, light emitting diodes (LEDs), an array or arrays of LEDs, or other light sources utilized for signal or source inputs into a transparent medium.

Transparent diffusers according to some embodiments can include light-scattering materials designed to be highly transparent for external ambient rays (e.g., scenery viewed through a window or other transparent medium or pixels from a display viewed through a cover film or cover glass) while at the same time being scattering or reflective for other optical modes, such as waveguided modes. Transparent diffusers according to some embodiments can find utility in a variety of lighting systems, displays, or other applications where transparent luminaires (diffuse or spatially distributed light sources, such as lamps) or transparent display backlights are utilized.

As discussed in co-pending international application no. PCT/US13/43682, wavefronts associated with light from an object can travel over an object optical path from the object to a viewer through a transparent medium and form transmitted wavefronts. Optical distortion in transmitted wavefronts can arise from phase variations imparted by an uneven upper surface of the medium. An AG surface according to some embodiments can add a spatially dependent random phase term to the propagating wavefronts that distorts the image present to the viewer. Thus, some embodiments can add a compensating phase term via an optical distortion-reducing layer to reduce or eliminate optical distortion for light from an object light associated with an AG surfaces. Exemplary AG surfaces can include periodic, semi-random or random peaks P and valleys V or can include repeating or partially repeating primary structures such as hemispheres, prisms, gratings, retro-reflecting cube corners, or pseudo-random "binary" surfaces. Exemplary surfaces can also be a semi-random AG surface with engineered lateral spatial frequency content as described in U.S. Patent Application Publications No. US2011/0062849 A1; US2012/0218640 A1; and US2012/0300304 A1, the entirety of each incorporated herein by reference.

Exemplary AG surfaces can also include another transparent layer defining a second surface and/or having a second surface shape $h_2(x)$, or more generally $h_2(x,y)$ for two dimensions. In a non-limiting example, the transparent layer can be formed by a coating of a transparent material configured to reduce optical distortion, e.g., an optical distortion-reducing layer. The structure formed by the transparent medium and optical distortion-reducing layer can constitute an exemplary distortion-reducing anti-glare (DRAG) transparent structure.

Figure 1B:
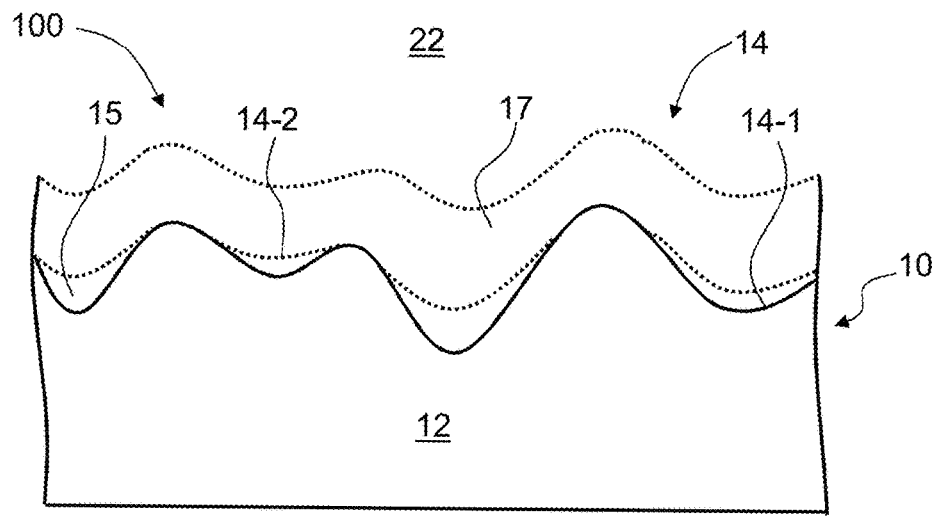
FIG. 1B is a plot illustrating another exemplary transparent structure.

FIG. 1A is a plot illustrating an exemplary transparent structure. FIG. 1B is a plot illustrating another exemplary transparent structure. With reference to FIGS. 1A and 1B, an exemplary transparent structure 100 having an optical distortion caused by an AG surface 14 can be described using a Fourier optics model propagating wavefronts through a transparent medium 10. The model generally describes the AG surface 14 as having an optical phase $\varphi(x,y)$. For an AG surface 14 having a first surface 14-1, the electric fields E associated with the propagation of wavefronts 36W may be approximated by the expression $$E_{after} = E_{before}e^{i\varphi(x,y)} = E_{before}e^{i\frac{2\pi}{\lambda}\cdot[n_1 h_1(x,y)+n_3(t-h_1(x,y))]} \quad (1)$$

where $E_{before}$ represents the electric field just before rough surface 14-1, $E_{after}$ represents the electric field just after the rough surface, $n_1$ and $n_3$ represent the refractive indices on either side of the rough surface, $\lambda$ represents the wavelength of object light, t represents a constant reference plane, and $h_1(x,y)$ represents the aforementioned height profile of the surface roughness for the first surface.

A reference plane RP or t can be used to provide a reference for the phase and a location from which $h_1(x,y)$ and $h_2(x,y)$ can be measured. The location of reference planes RP and t are arbitrary, provided that both are located at some distance before or after (i.e., above or below) the rough surface, as spatially invariant phase terms will not lead to image distortion. For example, to conceptually describe one situation in Equation 1, reference plane RP can lie below the rough surface, $h_1(x,y)$ and $h_2(x,y)$ can have positive values referenced to RP, and reference plane t can lie above the rough surface and be used to define a distance of air space above the rough surface as in Equation 1. To eliminate image optical distortion, $\varphi(x,y)=\text{constant}=\varphi_0$, implying that if a second surface 14-2 is not present, then either $h_1=\text{constant}$ (i.e., there is a smooth surface) or $n_1=n_3$ (i.e., there is no surface).

In the case where optical distortion-reducing layer 15 is present so that a second surface 14-2 is present, when body 12 of transparent medium has index $n_1$, transparent layer 14-2 has a refractive index $n_2$, and viewing space 22, which resides adjacent the transparent layer, constitutes a medium having a refractive index $n_3$, and when the condition $n_3<n_1<n_2$ is satisfied, it follows that:

$$E_{after} = E_{before}e^{i\phi(x,y)} = E_{before}e^{i\frac{2\pi}{\lambda}\cdot[n_1h_1(x,y)+n_2(h_2(x,y)-h_1(x,y))+n_3(t-h_2(x,y))]} \quad (2)$$

The requirement that $\varphi(x,y)=\text{constant}=\varphi_0$ for optical-distortion-free imaging allows one to solve Equation 2 for the second surface shape $h_2(x,y)$ in terms of the first surface shape $h_1(x,y)$:

$$\varphi(x,y) = \quad (3)$$
$$\frac{2\pi}{\lambda}\{n_1h_1(x,y) + n_2(h_2(x,y) - h_1(x,y)) + n_3(t - h_2(x,y))\} = const$$
$$(n_1 - n_2)h_1(x,y) - (n_3 - n_2)h_2(x,y) = const - n_3t$$
$$\therefore h_2(x,y) = \frac{(n_2 - n_1)}{(n_2 - n_3)}h_1(x,y) + c$$

The second surface shape $h_2(x,y)$ can thus be a scaled version of the first surface shape $h_1(x,y)$ via the relationship $h_2(x,y)=\psi \cdot h_1(x,y)$, wherein the scaling factor is represented as $\psi=(n_2-n_1)/(n_2-n_3)$, and c represents an arbitrary constant. To satisfy the physical condition that $h_2(x,y)$ is everywhere greater than or equal to $h_1(x,y)$, a minimum value for the constant c can be provided as:

$$c \geq \frac{(n_1 - n_3)}{(n_2 - n_3)}(h_1(\max)) \quad (4)$$

where $h_1(\max)$ represents a constant for a given structure, equal to the global maximum height of surface shape $h_1(x,y)$. When the constant c is equal to the above minimum value term $(n_1-n_3)/(n_2-n_3)\cdot(h_1(\max))$ in Equation 4, this corresponds to the special case where $h_2=h_1$ at the peak locations of $h_1(x,y)$ (at the spatial locations where $h_1(x,y)=h_1(\max)$).

Physically, this represents a case where the peaks of $h_1(x,y)$ do not have any additional coating material on top of them. It is also noted that c may be greater than the minimum value term in Equation 4 which adds a constant offset to the optical path length at every location across the surface of the structure. Thus, in some embodiments, material making up an exemplary optical distortion-reducing coating layer 15 can partially fill valleys V of the first surface 14-1, with the thickness of the coating layer depending upon the depth and shape of each of the valleys. The lower the refractive index $n_2$ that makes up coating layer 15, the thicker the coating layer should be in the valleys V. Thus, an optical distortion-reducing layer 15 can form a quasi-conformal layer atop the first surface 14-1.

When the condition $n_3<n_1<n_2$ for the AG surface 14 is satisfied, the scaling factor $\psi$ can be less than 1 making the root-mean-square (RMS) surface roughness of the second surface 14-2 less than the RMS of underlying first surface 14-1. The presence of a higher-index medium at the AG surface 14 can lead to different reflection and transmission-haze properties. These modified AG properties may be accounted for in the design of an exemplary AG surface 14. For example, a light-transmitting structure having the first AG surface can be defined by the first surface 14-1 of the transparent medium 10 and include a first surface shape $h_1(x,y)$, an optical-distortion-reducing layer 15 residing immediately adjacent the first surface and having a refractive index $n_2>n_1$ which defines a second surface 14-2 having a second surface shape $h_2(x,y)$, and a medium immediately adjacent the second surface opposite the first surface and having a refractive index $n_3$ where $n_3<n_1$, and where $(n_2-n_1)/(n_2-n_3)\cdot h_1(x,y) \leq h_2 \leq 0.5((n_2-n_1)/(n_2-n_3)\cdot h_1(x,y))$. That is, where $h_2$ is within 50% of $(n_2-n_1)/(n_2-n_3)\cdot h_1(x,y)$. In other embodiments it is preferred that $(n_2-n_1)/(n_2-n_3)\cdot h_1(x,y) \leq h_2 \leq 0.8((n_2-n_1)/(n_2-n_3)\cdot h_1(x,y))$. That is, where $h_2$ is within 80% of $(n_2-n_1)/(n_2-n_3)\cdot h_1(x,y)$.

In the alternate condition $n_3<n_2<n_1$ (with low-index material with $n_2$ filling the valleys of the first surface shape $h_1(x,y)$), Equations (3) and (4) apply, but the minimum constant value in Equation 4 may be applied to generate peaks of the second surface shape $h_2(x,y)$ rising to a higher amplitude than the peaks of $h_1(x,y)$. In this case, the peaks of $h_2(x,y)$ generally reside above the valleys of $h_1(x,y)$. Since $h_2(x,y)$ can be greater than or equal to $h_1(x,y)$, the peaks of $h_2(x,y)$ can generally correspond to the global peaks of the structure.

With continued reference to FIGS. 1A and 1B, an exemplary structure 100 is provided where an optical distortion-reducing layer 15 has a lower refractive index than underlying transparent medium 10. In such a case, the AG surface 14 can be configured for the case of an optical distortion-reducing layer 15 having an index of refraction that is less than that of transparent medium 10, i.e., for the condition $n_3<n_2<n_1$. For this situation, valleys V can be overfilled rather than underfilled, so that optical distortion-reducing layer 15 forms bumps that are highest where the valleys are deepest, as illustrated in FIG. 1A. With reference to FIG. 1B, in an exemplary embodiment, an additional coating layer 17 can be added immediately adjacent the coating layer 15 (and any exposed portions of first surface 14-1) without impacting the reduced optical distortion associated with the AG surface 14. For example, a coating layer 17 can be configured as an anti-reflection (AR) coating (e.g., it can include multiple sub-layers) to thereby provide both anti-glare and anti-reflection properties to a transparent medium 10.

In another embodiment, the AG surface 14 can be designed so that essentially no image optical distortion exists. This can be accomplished by requiring that $\varphi(x,y)$ be substantially or identically constant. Other embodiments can reduce an image optical distortion from the transparent medium 10, recognizing that in many applications a partial reduction may be easier and more cost-effective to implement than a full reduction. Thus, in an exemplary embodiment, Equation 3 need not be fully satisfied. Accordingly, statistics of a residual phase across the surface φ(x,y) can be examined by the following relationship:

$$\Delta\varphi(x, y) = \frac{2\pi}{\lambda}\left[h_2(x, y) - \frac{(n_2 - n_1)}{(n_2 - n_3)}h_1(x, y)\right]. \tag{5}$$

For an exact phase match, it is specified that $\Delta\varphi(x,y)=\Delta\varphi_0$ so that $\Delta\varphi_{rms}=0$, where $\Delta\varphi_{rms}$ represents the root mean square of $\Delta\varphi(x,y)$. When the coating does not exactly satisfy Equation 3, for example, it can be required that $\Delta\varphi_{rms}$ be approximately less than about $2\pi/10$ to achieve a substantial reduction in the amount of optical distortion.

Embodiments of the present disclosure can also include configurations that do not necessarily have discrete first and second surfaces 14-1 and 14-2. Thus, in some embodiments, the transparent medium 10 can have a textured surface 14-1. The light phase modulation introduced by such a textured surface 14-1 as well as by a bulk refractive-index modulation is provided by the following relationship:

$$E_{after} = E_{before}e^{i\phi(x,y)} = E_{before}e^{i\frac{2\pi}{\lambda}[n_1 h_1(x,y)+\Delta OPL_{bulk}(x,y)+n_3(t-h_1(x,y))]} \tag{6}$$

where $h_1(x,y)$ represents the topology of the textured surface 14-1, $n_1$ represents the mean index of the bulk material and $\Delta OPL_{bulk}(x,y)$ represents the topology of the bulk optical path length variation, as defined by the integral in the direction of the bulk optical path length (i.e., the Z-direction:

$$\Delta OPL_{bulk}(x, y) = \int_{bulk} (n_{bulk}(x, y, z) - n_1)z\,dz \tag{7}$$

The phase upon reflection for reflected ambient light 26 is provided by $$\varphi_R(x, y) = \frac{2\pi}{\lambda}[2n_3(t - h_1(x, y))],$$

which represents a function of the surface roughness of the first surface 14-1. Consequently, the first surface 14-1 can be configured with a surface shape providing desired scattering properties when reflecting ambient light to reduce the amount of light from glare.

The phase for transmitted light through a structure can be denoted as phase $\varphi_T(x,y)$ and is provided by $$\varphi_T(x, y) = \frac{2\pi}{\lambda} \cdot [n_1 h_1(x, y) + \Delta OPL_{bulk}(x, y) + n_3(t - h_1(x, y))],$$

which depends on both the surface roughness and the bulk index variations. It is thus possible to define bulk index variations $n_{bulk}(x,y,z)-n_1$ that compensate for the phase variations associated with the surface texture (shape) of first surface 14-1 via the relationship:

$$\varphi(x, y) = \frac{2\pi}{\lambda} \cdot [n_1 h_1(x, y) + \Delta OPL_{bulk}(x, y) + n_3(t - h_1(x, y))] = const, \tag{8a}$$

$$(n_1 - n_3)h_1(x, y) + \Delta OPL_{bulk}(x, y) = const, \tag{8b}$$

$$\Delta OPL_{bulk}(x, y) = (n_3 - n_1)h_1(x, y) \tag{8c}$$

where the constant phase can be selected as zero.

Equations 8a-8c generally define ideal bulk index variations that compensate for phase distortion caused by the surface $h_1(x,y)$. When $n_3$ is less than $n_1$, the bulk optical path change (Equation 7) can be less than zero in regions where $h_1(x,y)$ has a peak and can be greater than zero where $h_1(x,y)$ has a valley. In terms of refractive index, this generally means that the bulk refractive index will be less than n in regions where $h_1(x,y)$ has a peak and greater than $n_1$ where $h_1(x,y)$ has a valley. The nature of the index variations (magnitude and spatial extent) can be determined by Equation 7 whereby index variations can be locally constant (isolated), but have uniform regions of higher or lower refractive index, or can be represented by a gradient in the refractive index (the magnitude of the variation can vary spatially).

While embodiments heretofore have been described as having one surface of the medium or structure with AG properties, the claims appended herewith should not be so limited and the dual surface mediums described in co-pending international application number PCT/US13/43682 are incorporated herein by reference in their entirety.

Figure 2A:
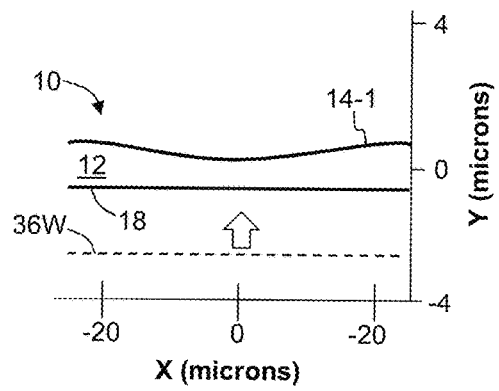
FIG. 2A is a plot illustrating an exemplary transparent medium with a conventional AG surface that is sinusoidal and uncoated.
Figure 2B:
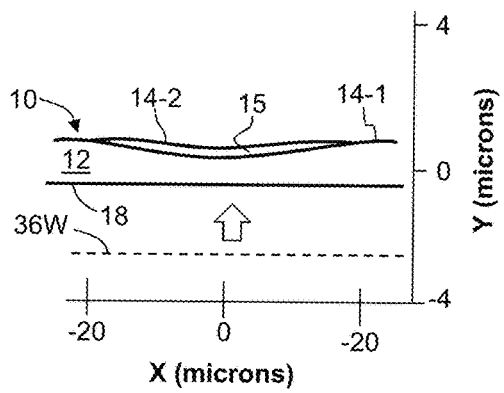
FIG. 2B is a plot illustrating a transparent medium with the sinusoidal first surface of FIG. 2A and an optical distortion-reducing layer defining a second surface.
Figure 3A:
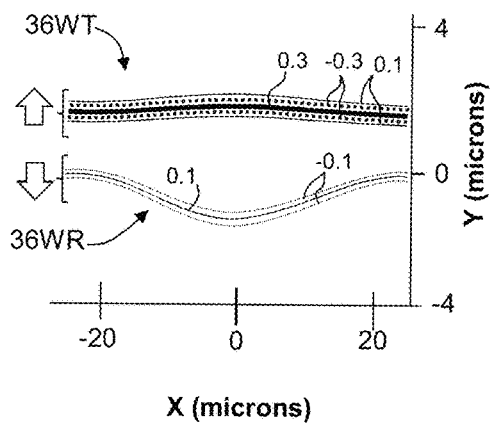
FIG. 3A is a plot illustrating a finite-difference time-domain (FDTD) simulation result for wavefronts having passed through the transparent medium of FIG. 2A.
Figure 3B:
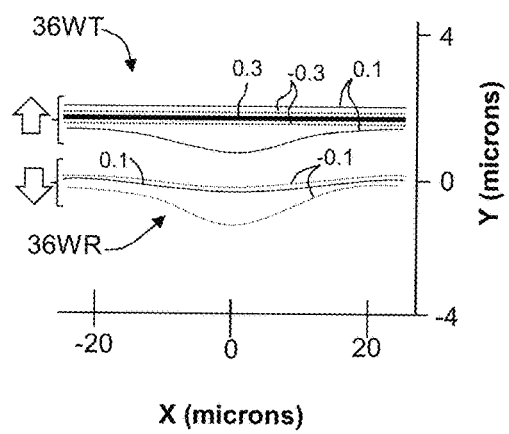
FIG. 3B is a plot illustrating a finite-difference time-domain (FDTD) simulation for the transparent medium of FIG. 2B.

Some embodiments can be understood through exemplary optical modeling. A non-limiting example of such modeling can apply a vectorial solution of Maxwell's equations through a finite-difference time-domain (FDTD) method accounting for optical effects. FIG. 2A is a plot illustrating an exemplary transparent medium with a conventional AG surface that is sinusoidal and uncoated. FIG. 2B is a plot illustrating a transparent medium with the sinusoidal first surface of FIG. 2A and an optical distortion-reducing layer defining a second surface. FIG. 3A is a plot illustrating a FDTD simulation result for wavefronts having passed through the transparent medium of FIG. 2A. FIG. 3B is a plot illustrating a FDTD simulation for the transparent medium of FIG. 2B. With reference to FIG. 2A, the figure shows a transparent medium 10 where a first surface 14-1 can be a sinusoidal and uncoated AG surface. FIG. 2B illustrates a transparent medium 10 where the sinusoidal first surface 14-1 includes an optical distortion-reducing layer 15 defining a second surface 14-2 and satisfying the optical-distortion-free-imaging requirement of Equation (3). The transparent medium 10 can be modeled as a glass substrate having a refractive index $n_1$=1.5, while optical distortion-reducing layer 15 has a refractive index $n_2$=2.0. FIGS. 2A and 2B also show a single-plane wavefront 36W of unit electric field amplitude on its way to passing through the respective structures at normal incidence (i.e., with the plane wave parallel to lower surface 18). The single plane wavefront 36W represents a pulse of light 36 from an object (not shown). The x-directions and y-directions are shown, with the units in microns. With reference to FIG. 3A, a FDTD simulation result is illustrated for wavefronts 36WT having passed through the transparent medium 10. FIG. 3B provides the corresponding simulation for the transparent medium 10 including an optical distortion-reducing layer 15. Also shown in the plots are reflected wavefronts 36WR. The transparent medium 10 and the combined transparent medium and optical distortion-reducing layer 15 are omitted from FIGS. 3A and 3B, respectively, for ease of illustration. Some of the relative electric-field-amplitude contours of transmitted and reflected wavefronts 36WT and 36WR are shown representing a snapshot of the electric field amplitude. In these figures, it can be observed that the transmitted and reflected wavefronts 36WT and 36WR of FIG. 3A are distorted. The amplitude of the reflected wavefronts 36WR is substantially less than that of the transmitted wavefronts 36WT. The transmitted wavefronts 36WT of FIG. 3B are substantially flat (demonstrating low distortion in transmission) while the reflected wavefronts 36WR of FIG. 3B are still somewhat distorted (demonstrating a beneficial AG effect in reflection) when compared to their counterparts in FIG. 3A. Similar results were obtained for a continuous beam of object light 36 and at higher incident angles of up to 30 degrees.

Figure 4:
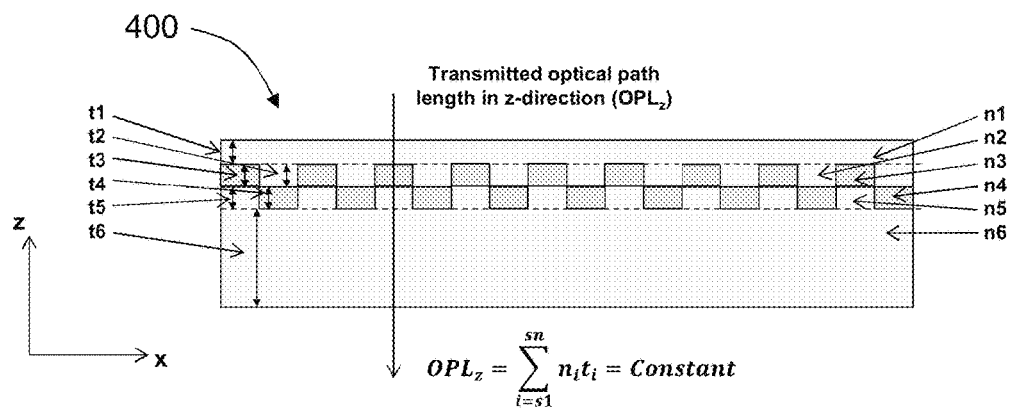
FIG. 4 is an illustration of an exemplary transparent diffuser according to some embodiments having refractive indices n and thicknesses t.

In exemplary transparent diffuser structures, it was discovered that the OPL for external transmitted rays through the structured regions of the article should be the same (or nearly the same) at plural locations across the surface thereof. FIG. 4 is an illustration of an exemplary transparent diffuser according to some embodiments having refractive indices n and thicknesses t. With reference to FIG. 4, some embodiments can include a spatially varying refractive index profile in the plane of an exemplary diffuser sheet 400 which breaks translational symmetry in the plane (the x-y plane of FIG. 4) of the transparent diffuser, enabling light scattering for reflected or waveguided modes. In the case of a rough surface transparent diffuser or structure, this enables scattering of external reflected rays resulting in an AG effect. For lightguide or luminaire applications, the broken translational symmetry in the x-y plane of the diffuser enables out-coupling of waveguide modes from an edge light source (now shown). In addition, an exemplary luminaire can be designed in a reflective mode where a light source positioned near the edge of the transparent diffuser can reflected from the diffuser surface. With reference to FIG. 4, a condition of constant OPL can be written as:

$$OPL_z = \sum_{i=s1}^{sn} n_i t_i = \text{Constant} \tag{9}$$

where S1 represents a first structured region (analogous to region t2 in FIG. 4 as t1 is non-structured) and sn represents the $n^{th}$ structured region (in this case, region t5 in FIG. 4 as t6 is non-structured).

For some embodiments, the transmitted optical path length in the z-direction $OPL_z$ (or a range of angles near the z-direction) through the structured portion of the diffuser 400 can be constant or nearly constant for adjacent spatial locations in the x-y plane (for example, spatial locations that are within 1 cm, 1 mm, 0.1 mm, or 0.01 mm of each other in the x-y plane). When the OPL is nearly constant, embodiments can be engineered to provide a variation in OPL that is, for example, less than about ½λ, less than ¼λ, or less than ⅛λ through the adjacent structured regions of the diffuser 400. The OPL through the non-structured portions of the diffuser 400, regions t1 and t6 are less critical as these regions are non-structured (generally homogeneous in x and y directions) so that any variations in OPL in regions t1 and t6 are very gradual (i.e., the OPL is substantially constant for adjacent spatial locations) and do not lead to small lateral-length-scale phase front distortions (in the x-y direction) resulting in optical scattering. Of course, the embodiment illustrated in FIG. 4 should not limit the scope of the claims appended herewith as there can be a higher (or lower) number of structured elements or regions (e.g., t7, t8, t9, etc.) than that shown. Exemplary structured regions can be characterized by broken translational symmetry (an inhomogenous optical path or varying refractive index) along the x- and/or y-directions which creates some degree of light scattering for reflected modes or waveguided modes. Exemplary structured elements can also be regular or periodic as illustrated in FIG. 4, but can also be random, semi-random, non-periodic, etc. as discussed above. In the case where the refractive index n1 and optionally n2 have a refractive index of 1 (i.e., air), the structure may a rough surface. In some embodiments, the characteristic sizes of the structured elements in the z-dimension can be, but are not limited to, less than about 0.05 microns, between about 0.05 microns to about 10 microns, from about 0.05 microns to about 50 microns, between 50 microns and 100 microns, etc. In some embodiments, the sizes of the structured elements in the x- and/or y-dimensions can be in the range of about 0.05 microns to about 100 microns or more. Non-limiting refractive indices of regions in the structured elements (e.g., regions t2-t5) can be, but are not limited to, in the range of 1.0 (a void) to 2.5, from 1.0 to 1.3, from 1.0 to 2.0, from 1.3 to 2.0.

Figure 5:
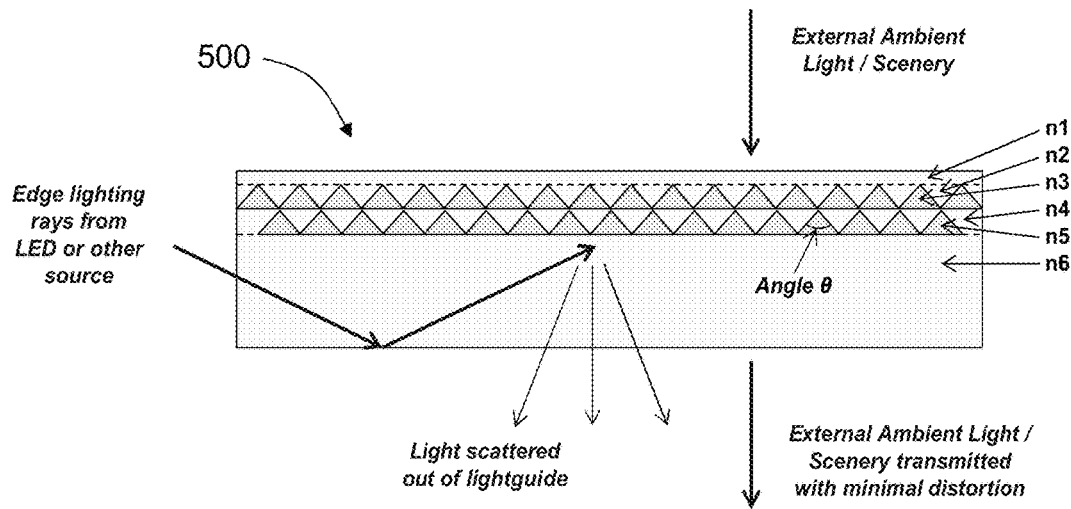
FIG. 5 is an illustration of another exemplary transparent diffuser according to some embodiments having refractive indices n and a buried scattering structure.
Figure 6:
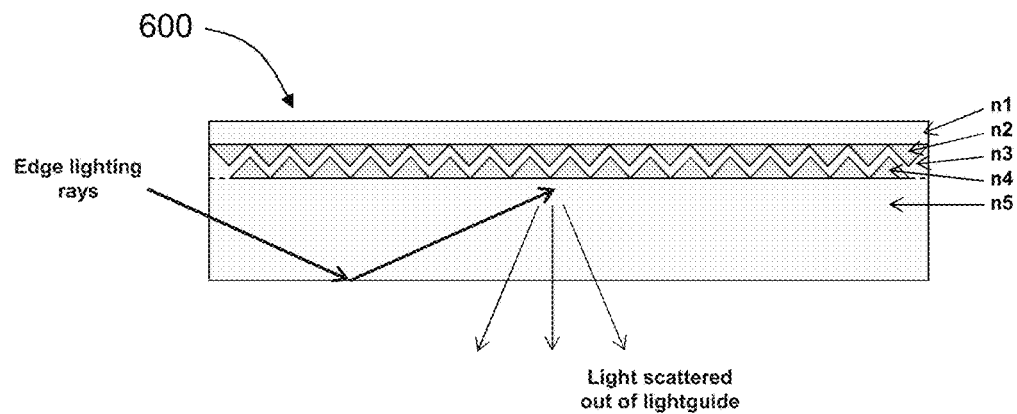
FIGS. 6 and 7 are illustrations of additional embodiments of exemplary transparent diffusers according to some embodiments.
Figure 7:
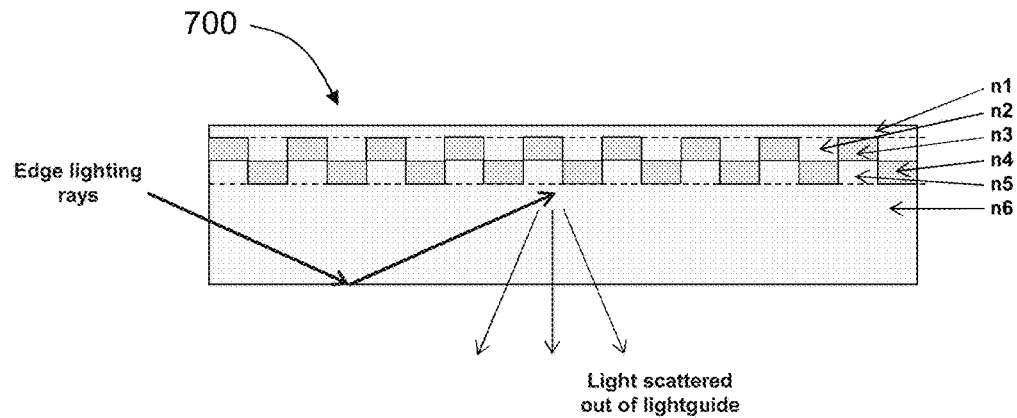

FIG. 5 is an illustration of another exemplary transparent diffuser 500 according to some embodiments having refractive indices n and a buried scattering structure. With reference to FIG. 5, the refractive indices n1-n6 and geometries of the scattering features 502 can be selected to avoid total internal reflection for externally incident transmitted light in one or both major directions. The externally incident light can be provided by a primary light source such as an edge LED, an array of LEDs, a laser, or another other suitable light source. For example, when n5 is about 1.52 and the angle θ is about 90 degrees, then n4 should be greater than about 1.1, or more preferably greater than about 1.3, to avoid total internal reflection effects which can reduce or distort the transmission of external ambient light in one or more directions or create objectionably high reflection for external ambient light in one or more directions. Thus the scenario where one or more of n2, n3, n4, and n5 are equal to 1 in the prismatic-like geometry depicted in Figure is a comparative example that is not preferred. FIGS. 6 and 7 are illustrations of additional embodiments of exemplary transparent diffusers according to some embodiments. Again, the externally incident light can be provided by a primary light source such as an edge LED, an array of LEDs, a laser, or another other suitable light source. With reference to FIGS. 6 and 7, exemplary transparent diffusers 600, 700 can be a luminaire, lightguide or waveguide with a prismatic or non-prismatic buried scattering structure (periodically, randomly, semi-randomly, etc. repeating) whereby the diffuser 600, 700 includes a smooth external surface. Similar to the embodiments described above, in embodiments having a prismatic or near-prismatic geometry, one or more of the refractive indices should be greater than 1.1 or even greater than 1.3, e.g., n3 is greater than 1.1 or 1.3.

In some embodiments finding utility in transparent luminaires, transparent displays, HUDs, HMDs, transparent backlight applications, etc., an exemplary transparent diffuser can be coupled to a suitable light source (e.g., LED, array of LEDs, laser(s), or other known sources). For example, in an edge-lit mode, a suitable light source(s) can be coupled into waveguide or total-internal-reflection modes of the transparent diffuser, diffuser substrate, or other transparent component which is bonded or optically coupled to the transparent diffuser. Waveguided modes can be scattered out of the transparent diffuser according to a pre-determined pattern, which could form a gradient pattern in one or more of the x- and y-directions (see FIG. 4) to create spatially uniform out-coupling of the light. This could be achieved, for example, by varying the lateral feature spacing or refractive index contrast in the x-y plane of the transparent diffuser structure to create a gradient in the light scattering intensity. At the same time, an exemplary diffuser can be designed to be highly transparent for external ambient rays as described above due to the phase matching or near-phase-matching in transmission of the structured region for adjacent x-y spatial locations.

In a front-lit mode, an exemplary diffuser can include a light source configured to reflect light from the transparent diffuser structure. The light source can be located near the edge of the transparent diffuser to minimize blocking of external ambient transmitted rays or to minimize higher reflectivity due to grazing incidence reflections. In some embodiments, an exemplary diffuser or other structure can scatter (i.e., cause deviation from specular ray angles by more than about 0.5 degree, more than 1 degree, or more than about 10 degrees) more than 1%, more than 5%, more than 10%, or more than 20% of light that is reflected from the structure at a glancing angle or injected into waveguide modes of the structure (as in an edge-lit waveguide).

Figure 8A:
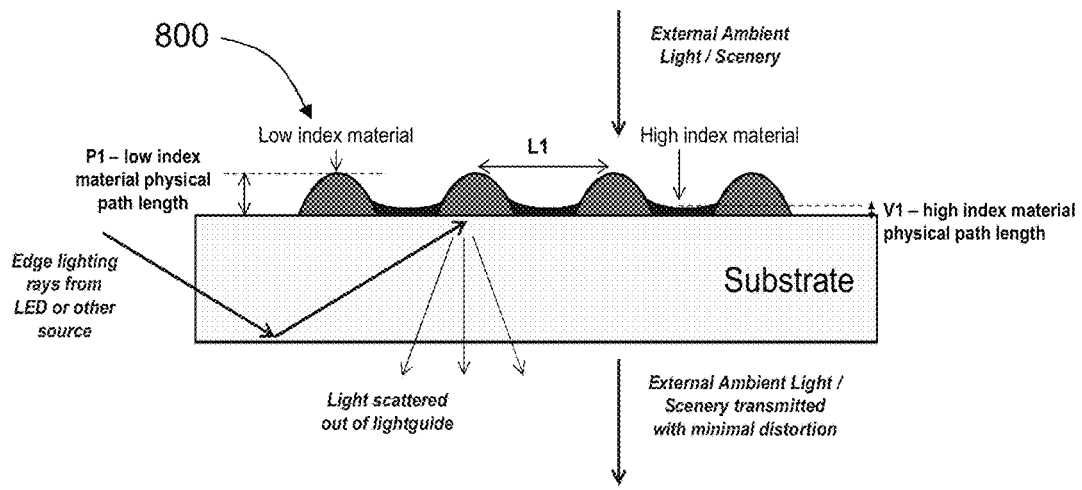
FIGS. 8A and 8B are illustrations of structures having external rough surfaces.
Figure 8B:
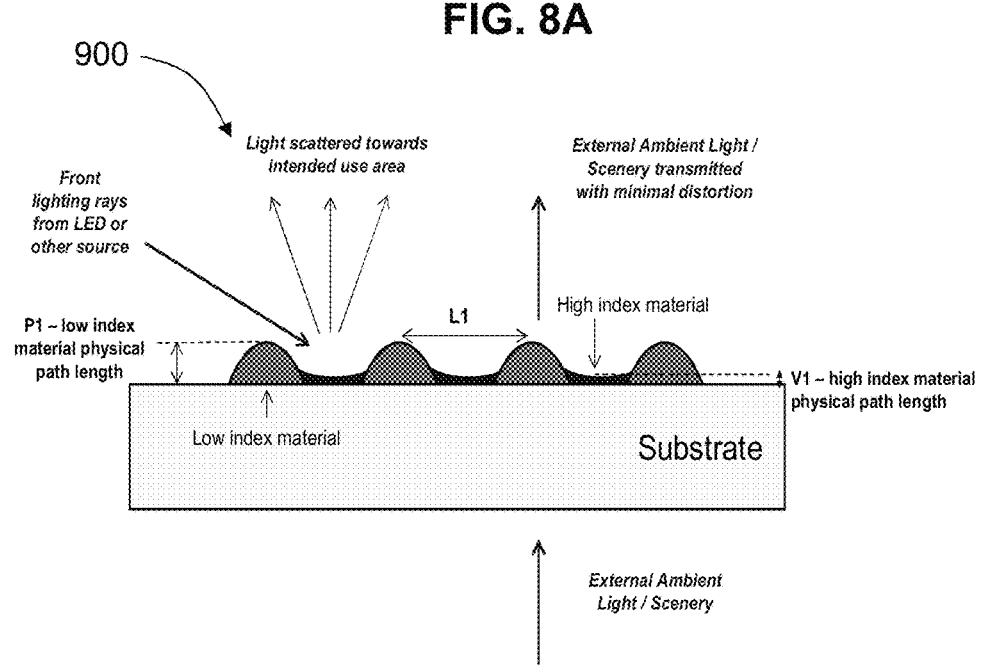

Additional embodiments can include rough, semi-rough surfaces as described above and/or include buried structures. FIGS. 8A and 8B are illustrations of structures having external rough surfaces. With reference to FIGS. 8A and 8B, exemplary transparent diffusers 800, 900 can include a surface having periodic, semi-random or random peaks P and valleys V or can include repeating or partially repeating primary structures such as hemispheres, prisms, gratings, retro-reflecting cube corners, or pseudo-random "binary" surfaces. As described above, these peaks and valleys can include materials having differing indices of refraction (high index material in the valleys and low index material on the peaks) to control OPL therethrough. FIG. 8A illustrates a transparent diffuser-based luminaire or lightguide 800 having an external rough surface and edge lighting rays provided from an LED, array of LEDs or other suitable light source whereby light can be scattered by the materials contained on the surface having varying indices of refraction. A secondary source of light (ambient light or scenery) can be transmitted through such a structure 800 as described above with minimal to no distortion. While not shown, it is also envisioned that such edge lit embodiments 800 can include both buried structures (FIGS. 4-7) as well as rough surfaces having varying indices of refraction. FIG. 8B illustrates a transparent diffuser-based luminaire or lightguide 900 having an external rough surface and front lighting rays from an LED, array of LEDs or other suitable light source whereby light can be scattered by the materials contained on the surface having varying indices of refraction. A secondary source of light (ambient light or scenery) can be transmitted through such a structure 900 as described above with minimal to no distortion. While not shown, it is also envisioned that such front lit embodiments 900 can include both buried structures (FIGS. 4-7) as well as rough surfaces having varying indices of refraction.

Figure 9A:
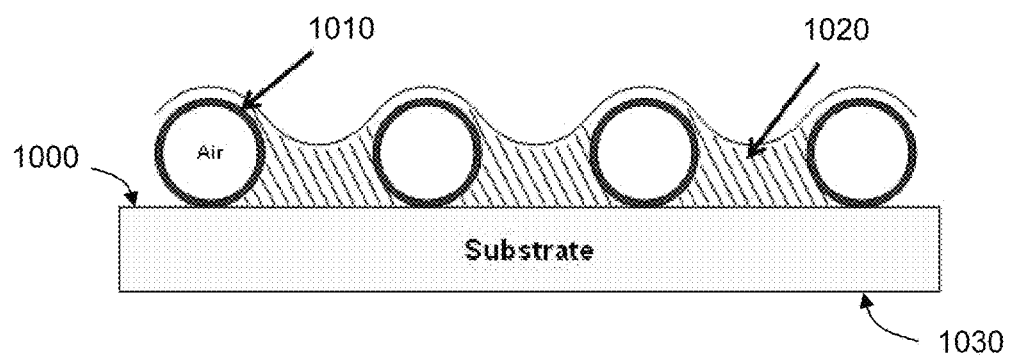
FIGS. 9A-9C are illustrations of additional embodiments.
Figure 9B:
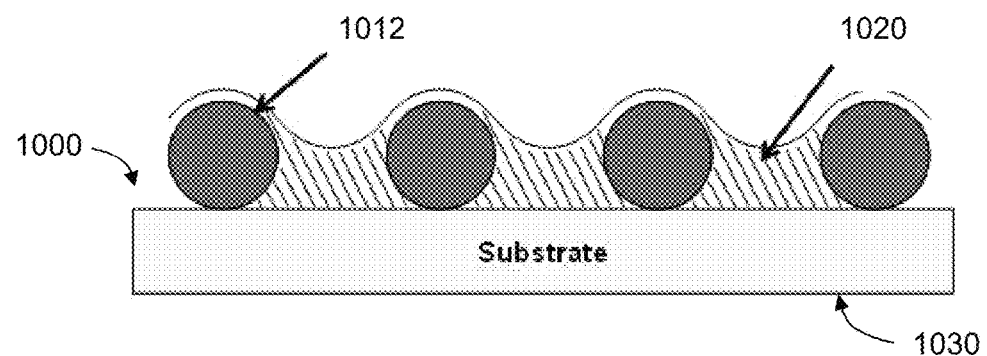
Figure 9C:
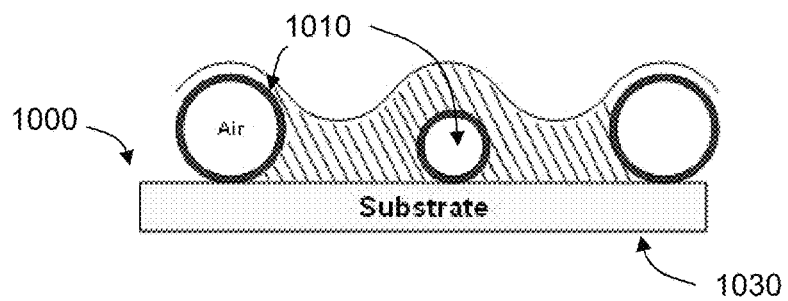

FIGS. 9A-9C are illustrations of additional embodiments. With reference to FIGS. 9A-9C, exemplary transparent diffusers 1000 can incorporate particles or void regions. With reference to FIGS. 9A and 9C, an exemplary diffuser 1000 can include hollow particles 1010 (e.g., a hollow glass microsphere with a shell index of ranging from about 1.1 to about 1.5 to about 1.7 or more) with a polymeric or sol-gel binder or filler 1020 overlying a substrate 1030. Exemplary fillers include, but are not limited to, UV-cured acrylates, solve-born PMMAs, fluoropolymers, SiO2 sol-gels, nano-particle-filled acrylates, TiO2 sol gels, and other materials having indices ranging from about 1.1 to about 1.5, from 1.3 to about 1.6, or from about 1.5 to about 2.2. The hollow particles 1010 can be filled with air or other suitable gas. With reference to FIG. 9B, an exemplary diffuser 1000 can include low-index solid or nano-porous particles 1012 (e.g., glass, fluoropolymer or SiO2 with an index of ranging from about 1.1 to about 1.5 to about 1.7 or more, from 1.25 to about 1.45, etc.) with a polymeric or sol-gel binder or filler 1020 overlying a substrate 1030. Exemplary fillers include, but are not limited to, UV-cured acrylates, solve-born PMMAs, fluoropolymers, SiO2 sol-gels, nano-particle-filled acrylates, TiO2 sol gels, and other materials having indices ranging from about 1.1 to about 1.5, from 1.3 to about 1.6, or from about 1.5 to about 2.2. Further and as illustrated in FIG. 9C, the hollow (FIG. 9A) or solid (FIG. 9B) particles can be varying shapes or sizes. Thus, in situations where particle size is non-uniform, it can be more practical to optimize the coating conditions so that the largest particles have the closest phase-matching in transmission since large particles generally drive more scattering effects. While not shown, it is also envisioned that such embodiments 1000 can be edge lit or front lit and can include both buried structures (FIGS. 4-7) in the substrate 1030 as well as the depicted structures with varying indices of refraction.

FIGS. 10A and 10B are models of an exemplary transparent diffuser having a rough surface profile. In FIG. 10A, the surface of the diffuser is uncoated and surrounded above and below by air (n=1). The refractive index of the glass diffuser substrate is 1.5. In FIG. 10B, portions of the surface are coated with a coating index of 2.0. FIGS. 11A and 11B are finite-difference time-domain (FDTD) simulations to account for optical effects in the embodiments depicted in FIGS. 10A and 10B. With reference to FIGS. 11A and 11B, these figures illustrate basic functions in transmission of an exemplary transparent diffuser structure whereby the images represent a snapshot of the electric field of a plane wave propagating from the bottom of the figure, up through the modeled surface. In FIG. 11A, a distortion of the flat phase front after the plane wave has passed through the uncoated glass (conventional rough surface) can be observed with a small reflection travelling in the backward direction. In FIG. 11B, a much flatter phase front after transmission through the transparent diffuser rough surface example can be observed.

The design of transparent diffuser structures according to embodiments herein can thus result in external ambient transmitted rays having one or more of high optical transmission, high optical clarity in transmission, low optical transmission haze, or a low percent (such as less than 10%, less than 5%, or less than 1%) of transmitted light that is scattered into angles greater than about 0.1 degrees, greater than 1 degree, greater than 2 degrees, greater than 5 degrees, or greater than 10 degrees. Exemplary transparent diffusers can also preserve etendue in transmission, or to have a small change in etendue in transmission. Essentially, exemplary transparent diffusers can have a larger scattering effect for reflected or waveguided modes than for transmitted external light. In some embodiments it can be desirable to boost overall reflectivity or scattering strength through careful selection of the refractive indices of the scattering elements. For example, one or more than one of the scattering elements (see, e.g., t2-t5 in FIG. 1) can be include a refractive index higher than 1.4, higher than 1.5, higher than 1.6, higher than 1.7, or higher than 1.8. One or more of the scattering elements can be chosen to have a refractive index exceeding the refractive index of a carrier substrate by more than about 0.05, more than 0.1, more than 0.2, or more than 0.3. Thus, in some cases the reflectivity of the overall transparent diffuser article can be greater than 5%, greater than 10%, greater than 20%, or even greater than 50%.

Exemplary transparent diffuser articles can also include an asymmetric scattered light output. For example, by appropriate placement of the light source(s) relative to the scattering elements of the transparent diffuser, as well as control of the reflectivity of the structured region of the transparent diffuser through choice of refractive indices, scattered light can favorably be scattered towards one major direction (e.g., more scattered light from the LEDs can be directed towards the z-direction in FIG. 4 rather than towards the negative-z direction, or vice versa). This can be preferable for certain applications, such as transparent backlights, where light scattering toward a particular viewer or viewing area is preferred, and light scattered in the other major direction is largely wasted. In some embodiments, this can be obtained by designing the overall reflectivity of the transparent diffuser structure to be greater than about 50%, and placing the light source(s) on the same side of the structured regions of the transparent diffuser as the intended viewer or illuminated region. The 50% or more of light reflected from the transparent diffuser can thus be scattered towards the intended viewer. In other cases, such as the edge-lit waveguide case where the scattering elements form an external rough surface (e.g., FIG. 5), reflectivity of the transparent diffuser can be less than 50% (e.g., it can be 20% or even 10%) and the scattered light can be favorably emitted towards one major direction by appropriate balance of total internal reflection within the waveguide and scattering power of the transparent diffuser structures.

In some embodiments, it can be desirable to design the structured region of the transparent diffuser to have relatively high refractive indices compared to a substrate of the diffuser, as described above. In further embodiments, the transparent medium or substrate can have a refractive index of about 1.3 to 1.55 or more while the materials making up the scattering elements of the transparent diffuser have refractive indices outside of this range, e.g., materials with refractive indices lower than this exemplary and non-limiting range (such as 1.0 to 1.29) and/or refractive indices higher than this range (such as 1.56, 1.58, 1.6, 1.7, 1.8, 1.9, 2.0, or 2.5 and all values therebetween). For applications where a high overall reflectivity is desired, a reflective film such as a partially transparent thin metal film can be incorporated in the structure or coated/bonded onto the transparent diffuser to further enhance the scattering intensity or directionality of light scattered from the exemplary transparent diffuser. In other embodiments, exemplary transparent diffusers can exhibit light scattering for external ambient transmitted light that is greater at angles farther away from the z-direction and smaller for angles that are closer to the z-direction.

Transparent diffusers as described herein can be provided for a wide range of applications, including front surfaces of or buried interfaces within any display, protective covers for light-emitting displays of any size, touch screens, touch-sensitive surfaces, liquid-crystal displays (LCDs), organic light-emitting diodes (OLEDs), heads-up displays (HUDs), transparent HUDs, aquariums, laser based reflective heads-up displays, wearable displays, head mounted or mountable displays (HMDs), windows (for vehicles, housings, buildings, appliances, display cases, picture frames, freezers, refrigerators etc.), vehicle dashboards, vehicle visors, vehicle hoods, vehicle doors, sunglasses, or a glasses-based display, transparent backlights for displays such as LCDs, transparent building windows or skylights that also function as lamps when switched on, automotive windows that emit light when desired (such as for external or internal lighting of a vehicle), directional privacy windows that are transparent but emit light strongly in one direction, making it difficult for viewers on one side to see viewers on the other side, transparent projection screens, or generally any application that currently utilizes windows or could benefit from transparent displays or transparent light sources and generally for any application where an observer or optical system can view a scene or object through a transparent medium and where a second light source, e.g., ambient light, is present on the side where an observer, etc. resides.

Figure 21:
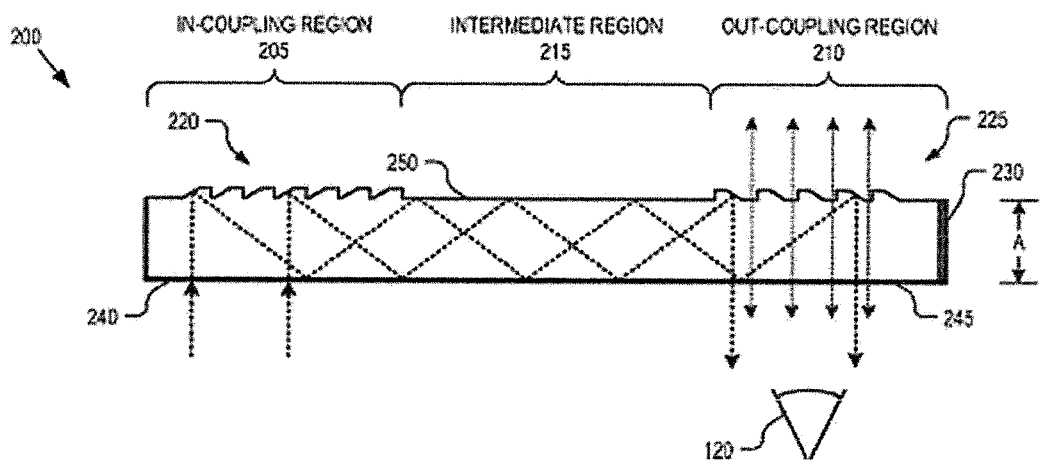
FIG. 21 is a conventional embodiment of a portion of a head mounted display.
Figure 22:
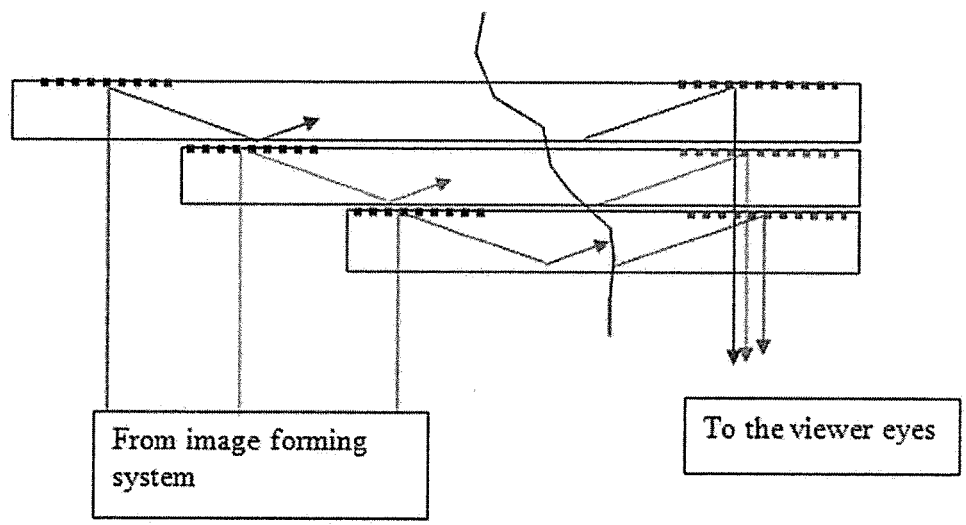
FIG. 22 is an illustration of an exemplary multiple waveguide configuration.
Figure 23:
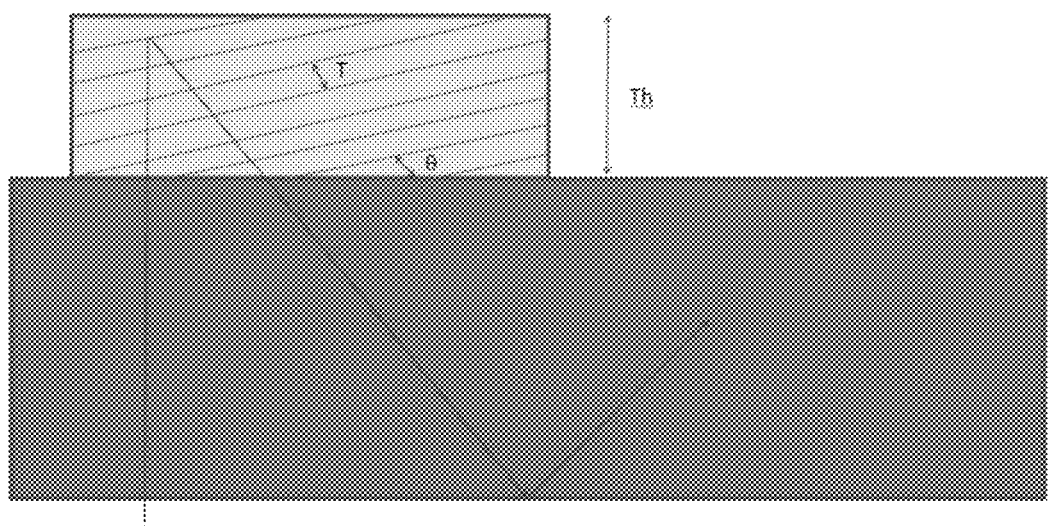
FIG. 23 is an illustration of a Bragg type structure where the bulk of the material presents some index modulation.

FIG. 21 is a conventional embodiment of a portion of a head mounted display. With reference to FIG. 21, an image waveguide 200 is illustrated having an in-coupling region 205, an out-coupling region 210, and an intermediate region 215. The in-coupling region 205 includes in-coupling mirror structures 220, and the out-coupling region 210 includes out-coupling mirror structures 225 and end cap surface 230. The image waveguide 200 is a single waveguide substrate (e.g., planar waveguide) that receives input light and emits output light from the same side surface of the waveguide substrate. The image waveguide 200 generally operates by receiving collimated input light at the in-coupling region 205. In-coupling mirror structures 205 are orientated to reflect the input light through image waveguide 200 towards the out-coupling region 220. The reflected input light is then guided towards the out-coupling region 210 by the intermediate region 215. In-coupling mirror structures 220 include reflective surfaces that are angled oblique to light incident surface 240. In-coupling minor structures 220 each include at least one reflective surface angled relative to the input light and sides of image waveguide 200 such that the reflected input light strikes the sides of image waveguide 200 with sufficiently oblique angles that it is guided within image waveguide 200 via total internal reflection. After the light propagates a predetermined distance, it can be extracted via a light extractor sent to a viewer. Exemplary light extractors (see, e.g., U.S. Pat. No. 8,446,675, the entirety of which is incorporated herein by reference) include arrays of microprisms larger than the wavelength so that any refraction effect is predominant over diffraction (e.g., the device is in a geometrical optics mode). This approach, however, does not fully account for the diffraction effect as an array of prisms (e.g., with 100 microns pitch) will create ghost images separated by 16 arc minutes in which a human eye can easily ascertain. To lower this diffraction below human resolution, a prism pitch on the order of 1-2 mm pitch would be necessary which also creates other significant image artifacts. Another approach for the light extractors can include using coupling gratings; however, these are sensitive to wavelength in term of angle of deflection as well as in term of diffraction efficiency. Thus, one solution includes using separated waveguides for each of the 3 colors R, G and B and have the light extractors optimized for each wavelength (see FIG. 22). FIG. 22 is an illustration of such a multiple waveguide configuration. With such a configuration, however, the light needs to go across the extractors located in the other waveguides and will, therefor be scattered. Thus, there is a need to have the out-coupling gratings transparent. One approach to avoid this includes making the coupling grating highly sensitive to wavelength in terms of efficiency so that only particular wavelength can be diffracted, e.g., a Bragg type structures where the bulk of the material presents some index modulation (FIG. 23). Such an embodiment, however, can present challenges as well as volumetric Bragg gratings are usually made via holography which can be inefficient for mass production. Bragg gratings also tend to include a narrow spectral bandwidth and the wavelength of the reflected Bragg resonance can shift as a function of the incidence angle thereby providing a limited projected field of view. Thus, surface or embedded scattering elements heretofore described can provide a wider spectral and angular acceptance in such embodiments.

Figure 24A:
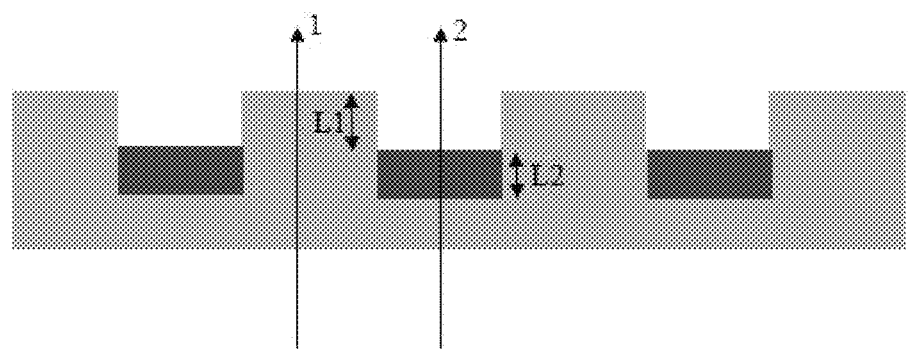
FIGS. 24A and 24B are exemplary transparent diffusing structures according to some embodiments.
Figure 24B:
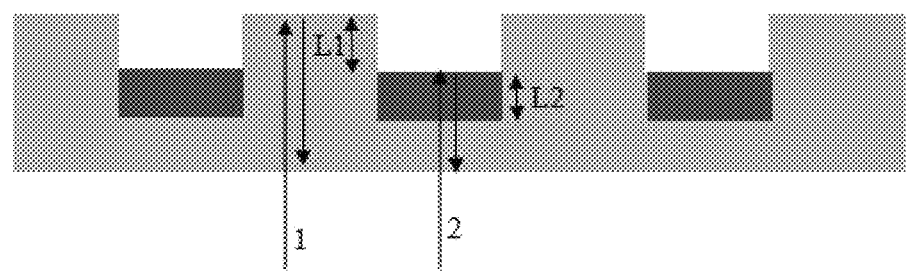

One exemplary embodiment includes a transparent diffusing surface as described above and illustrated in FIGS. 24A and 24B. With reference to FIGS. 24A and 24B, a surface texture (random, periodic or otherwise) as well as a bulk index modulation can be utilized alone or in combination to compensate in transmission. These two textures can be created, in some embodiments, by sequentially etching (surface texture) and ion exchanging (bulk index texture) through the same micro-lithographic mask. Calculating the OPD of the light beams 1 and 2 going through the exemplary structure provides the following relationships:

$$OPD_1 = 2n(L1+L2) \quad (10)$$

$$OPD_2 = (n+dn)L2 + L1 \quad (11)$$

where OPD represents optical path length differences, n represents the index of the material, and do represents the bulk index increase in the valleys of the embodiment. In the case where $L2 = (n-1) L1/dn$, it can be shown that OPD1=OPD2 which means that the phase of the light in transmission is not modulated and, therefore, light is not diffracted independently of its wavelength.

Considering light that is reflected it follows:

$$OPD1 = 2n(L1+L2) \quad (12)$$

$$OPD2 = 2(n+dn)L2 \quad (13)$$

By reducing these relationships and considering the previous condition $L2 = (n-1) L1/dn$, the following relationship can be obtained:

$$OPD1 - OPD2 = 2L1 \quad (14)$$

Thus, although there is no phase modulation in transmission, there can still be some modulation in reflection and the light can then be scattered.

Figure 12A:
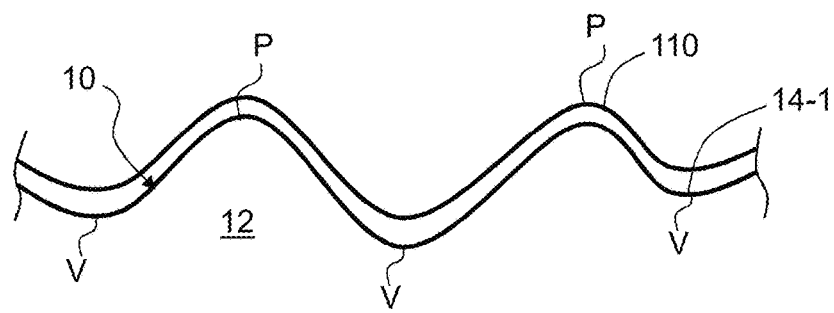
FIGS. 12A through 12D are simplified illustrations of embodiments of fabricating an exemplary structure using a non-wetting material as a masking layer and a high-index material as an optical distortion-reducing layer.
Figure 12B:
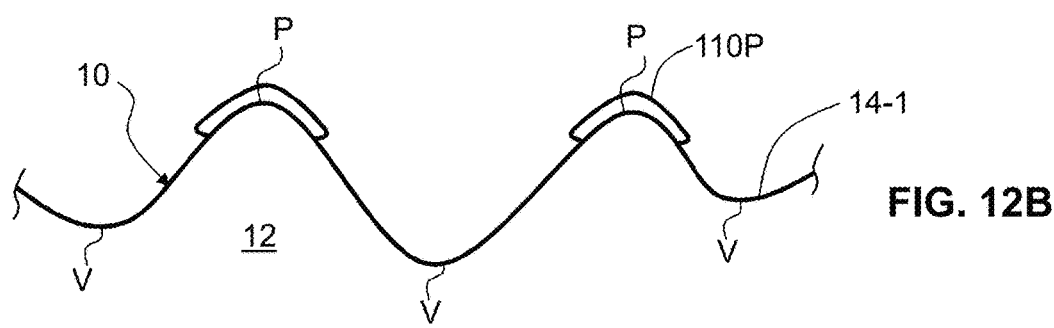

FIGS. 12A through 12D are simplified illustrations of embodiments of fabricating an exemplary structure using a non-wetting material as a masking layer and a high-index material as an optical distortion-reducing layer. With reference to FIGS. 12A-12D, these figures represent close-up cross-sectional views illustrating a non-limiting method of fabricating a structure 100 using a transparent medium 10. With reference to FIG. 12A, a transparent medium 10 is provided where a first surface 14-1 is textured. The first surface 14-1 can be formed in a variety of manners using known methods such as sandblasting, etching, lapping, embossing, stamping, grinding, micromachining, etc.

The first surface 14-1 can then be coated with a coating layer 110 comprising a phobic material that renders the surface non-wetting. An exemplary material for the coating layer 110 comprises, but is not limited to, phobic silanes, which can be spin-coated on in liquid form. The coating layer 110 may be applied using any known means such as spraying, dip-coating, physical vapor deposition, and spin-coating, depending on the particular material used With reference now to FIG. 12B, the coating layer 110 can be removed from the first surface 14-1, except for the regions surrounding peaks P, thereby leaving portions 110P of the coating atop the peaks. This can be accomplished, for example, by laser processing, by an optical exposure technique or by thermal processing (e.g., baking, thermal irradiation, etc.), to name a few. In an alternative embodiment, the coating layer 110 can be applied to the regions surrounding each peak P, for example, using methods such as stamping and micro-contact printing.

Figure 12C:
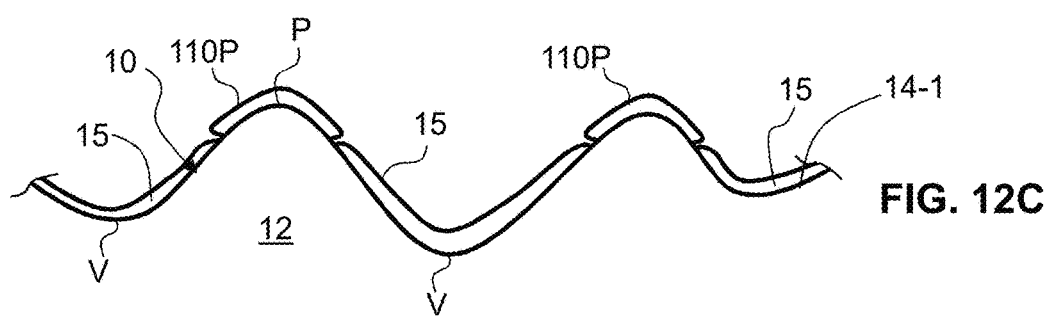
Figure 12D:
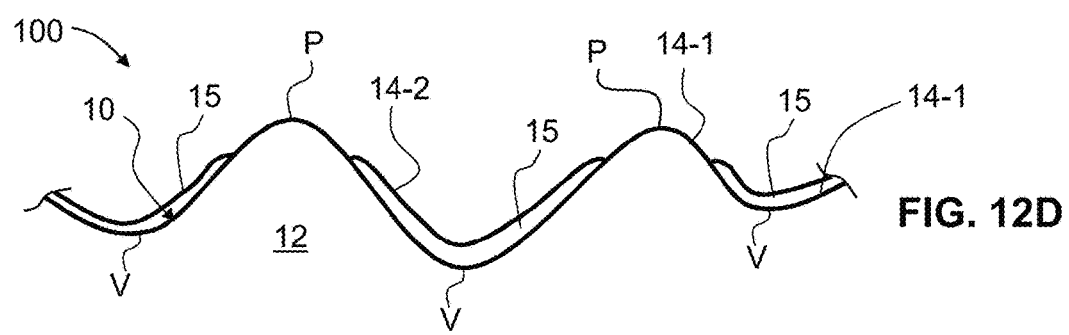

With reference now to FIG. 12C, once the peaks P are coated with portions 110P of non-wetting material, an optical distortion-reducing layer 15 of a relatively high-refractive-index material of refractive index $n_2$ (i.e., $n_2 > n_1$) can be applied using, for example, a wet-coating process. Because material portions 110P at the peaks are non-wetting, the wet material for the layer 15 will slip off peaks P and fill valleys V. It should be noted that surface tension can cause the material in layer 15 that fills valleys V to have a meniscus, which causes layer 15 to define second surface 14-2, which at least approximates the second surface shape $h_1(x,y)$ of Equation (3). The material of layer 15 can be, for example, an aqueous or non-aqueous polymer solution, a solvent-free monomer or polymer mixture, or an aqueous or non-aqueous sol-gel material such as TiO2, ZrO2, Al2O3, SiO2, or combinations of these or other materials known in the art. The layer 15 can then be consolidated and solidified (for example, through drying, thermal curing, UV curing, and the like) so that it remains in place on first surface 14-1. With reference now to FIG. 12D, non-wetting material portions 110P on peaks P can be removed (e.g., stripped using a suitable solvent, plasma cleaning, UV ozone, or heating process) to create the final structure 100.

Figure 13A:
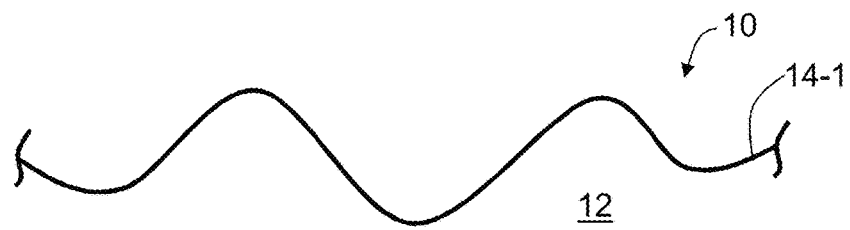
FIGS. 13A through 13C are simplified illustrations of additional embodiments of fabricating a structure using an ink jet printer head to selectively deposit a high-index material as the optical distortion-reducing layer.
Figure 13B:
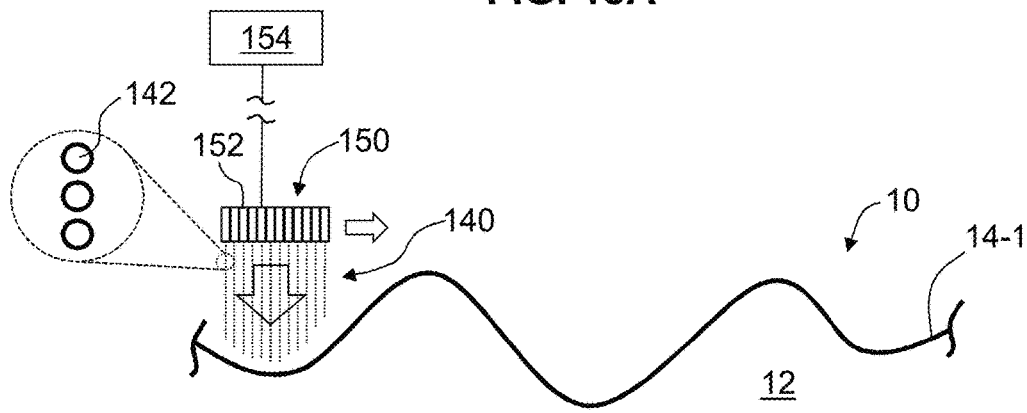
Figure 13C:
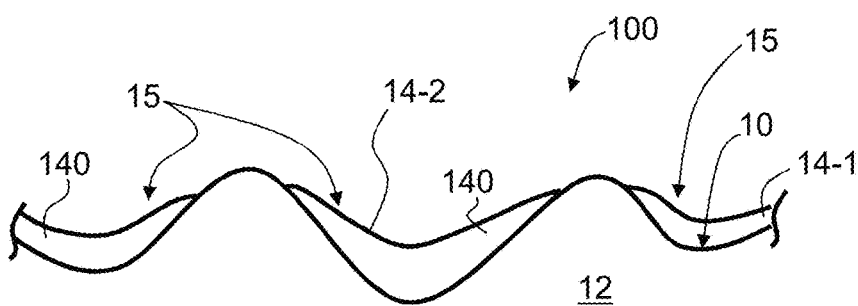

FIGS. 13A through 13C are simplified illustrations of additional embodiments of fabricating a structure using an ink jet printer head to selectively deposit a high-index material as the optical distortion-reducing layer. With reference to FIGS. 13A through 13C another exemplary method of fabricating structure 100 using transparent medium 10 that has a textured first surface 14-1 is shown. FIG. 13A shows a close-up section of the transparent medium 10 and its textured first surface 14-1. With reference now to FIG. 13B, a high-index coating material 140 can be selectively deposited as droplets 142 on the first surface 14-1. In one example, droplets 142 are propelled toward first surface 14-1 using an ink-jet printer head 150 that includes nozzles 152. The ink jet printer head 150 can be controlled by a programmable controller 154 to apply a pattern on first surface 14-1 that forms second surface 14-2 in accordance with Equation (3), above, as shown in FIG. 13C. The first surface shape $h_1(x,y)$ that defines the texture of first surface 14-1 can be measured using confocal microscopy, interferometry, an atomic force microscope, a profilometer or like surface-shape measuring devices. The first surface shape $h_1(x,y)$ can then be provided to controller 154, along with the indices of refraction $n_1$ and $n_2$ for the transparent medium 10 and material 140, respectively. The controller 154 can be programmed to process this information and direct the ink-jet printer head 150 to deposit material 140 to form a transparent layer 15 made of material 140 and having second surface 14-2 substantially defined by surface shape $h_2(x,y)$. The resulting structure 100 is shown in FIG. 13C.

Figure 14A:
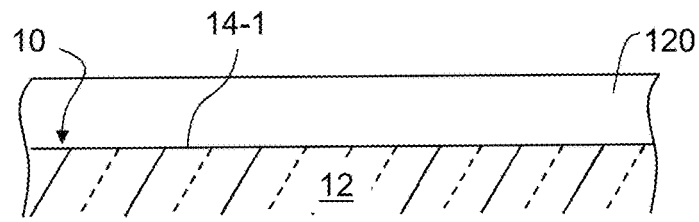
FIGS. 14A through 14D are simplified illustrations of further embodiments of fabricating a structure.
Figure 14B:
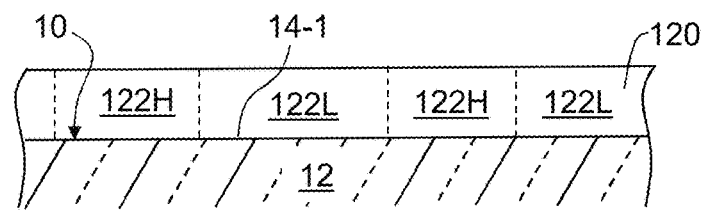
Figure 14C:
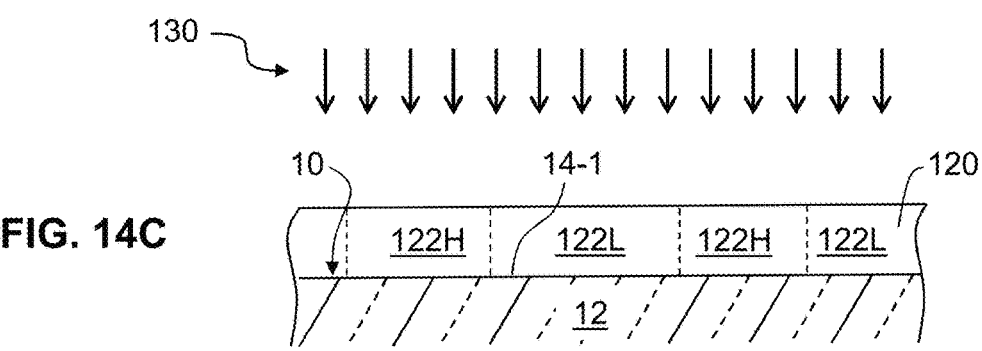
Figure 14D:
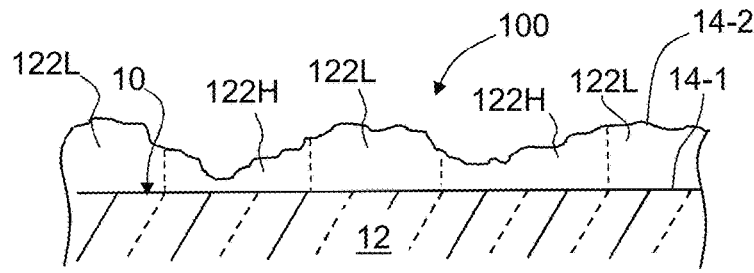

FIGS. 14A through 14D are simplified illustrations of further embodiments of fabricating a structure. With reference to FIGS. 14A through 14D another exemplary method of fabricating a structure 100 using transparent medium 10 that has a generally planar first surface 14-1 is shown. With reference to FIG. 14A and FIG. 14B, a phase coating 120 can be applied to a transparent substrate 10 on the first surface 14-1. The phase coating 120 can be formulated from a material that ultimately phase-separates and forms different regions 122H and 122L having high and low refractive indices, respectively (and thus different optical phases), where the regions are substantially randomly spatially distributed. This phase separation can occur in a liquid solution state, where phase separation can be driven by solvent or solvent-solute unmixing or it can occur as a solid-solid phase separation. An exemplary phase coating 120 has the property that regions 122H of a high refractive index have a higher etching rate than regions 122L of a low refractive index. With reference to FIG. 14C, phase coating 120 can be etched using an etching process 130 schematically depicted by arrows. The etching process 130 acts to remove the material making up high-index regions 122H faster than it does the material making up low-index regions 122L. The resulting structure 100 in shown in FIG. 14D.

Figure 15A:
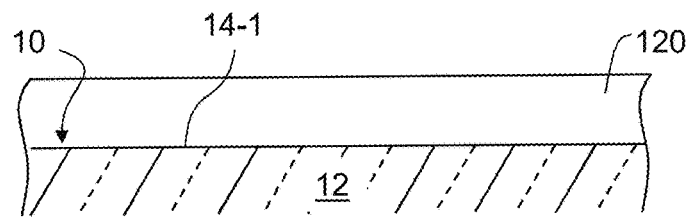
FIGS. 15A through 15D are simplified illustrations of additional embodiments of fabricating a structure.
Figure 15B:
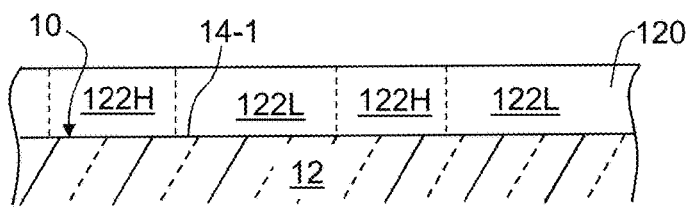
Figure 15C:
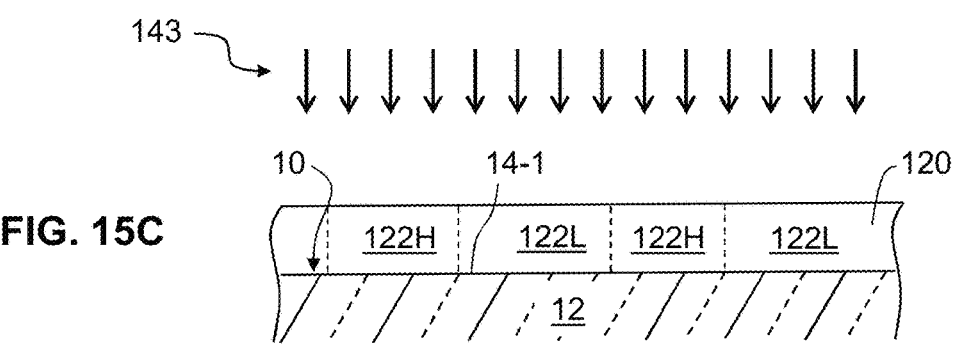
Figure 15D:
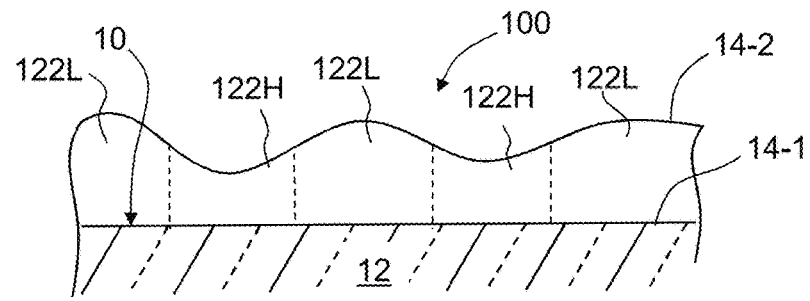

FIGS. 15A through 15D are simplified illustrations of additional embodiments of fabricating a structure. With reference to FIGS. 15A through 15D, a further method of fabricating structure 100 using a transparent medium 10 that has a generally planar first surface 14-1 is shown. This method is similar to the previously described method above in that it employs a phase coating 120. However, the regions 122H of phase coating 120 in this exemplary method have an even higher refractive index with a larger thermal consolidation tendency (i.e., the corresponding shrinkage due to sintering) than the lower-index regions 122L. Thus, after the phase coating 120 is applied (FIG. 15A) and then allowed to phase separate (FIG. 15B), heat 143 can be applied to the phase coating, as shown in FIG. 15C. The heat 143 causes the phase coating 120 to sinter and consolidate, with regions 122H and 122L consolidating at different rates, and in particular with low-index regions 122L consolidating by a smaller amount than high-index regions 122H. This difference in consolidation rate can be accomplished by, for example, engineering the phase coating 120 so that the high-index material has a lower glass transition temperature or melting temperature than the low-index material, or by engineering the high-index material in regions 122H to have a greater pore volume that shrinks upon heating. This, in turn, causes the phase coating 120 to take on an undulating shape resulting in the structure 100 shown in FIG. 15D.

Figure 16A:
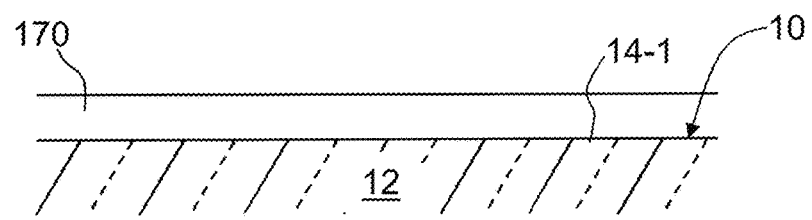
FIGS. 16A through 16H are simplified illustrations of some embodiments of a method of fabricating a structure using an ion-exchange process.
Figure 16B:
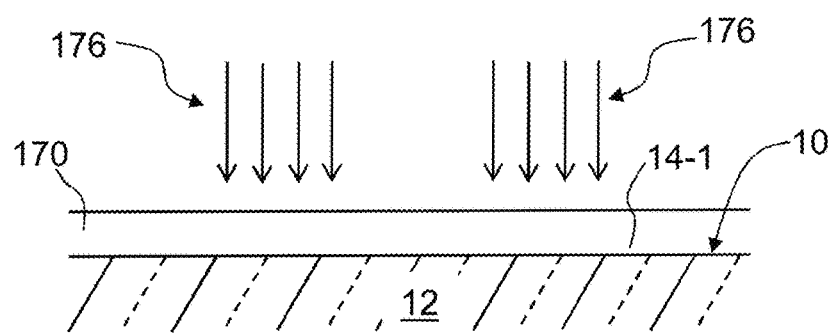
Figure 16C:
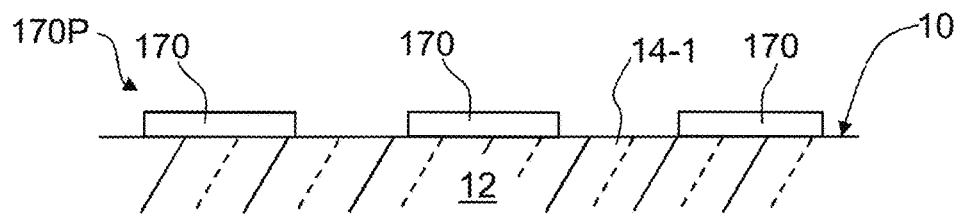

FIGS. 16A through 16H are simplified illustrations of some embodiments of a method of fabricating a structure using an ion-exchange process. With reference to FIGS. 16A through 16G another exemplary method of fabricating a structure 100 using a transparent medium 10 with a planar first surface 14-1 is provided. With reference first to FIG. 16A, a photomasking material 170 can be deposited on a first surface 14-1 of the transparent medium 10. An exemplary photomasking material 170 comprises photoresist such as is used in photolithography. The photomasking material 170 is photosensitive so when it is exposed to activating (actinic) light, the exposed material can be selectively removed, leaving a masking pattern. It should be noted, that the photomasking material 170 may comprise a negative photoresist, wherein the exposed material remains and the unexposed material is removed. With reference now to FIG. 16B, actinic light 176 can be used to selectively expose the photomasking material 170. For example, actinic light 176 can be directed to the photomasking material 170 through a reticle, while in another example the actinic light is scanned using a select scanning pattern. The exposed photomasking material 170 can then be processed (e.g., developed) to create a photomask pattern 170P, as shown in FIG. 16C.

Figure 16D:
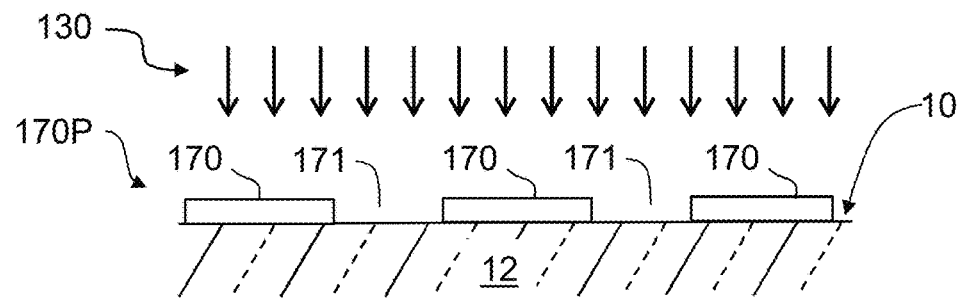
Figure 16E:
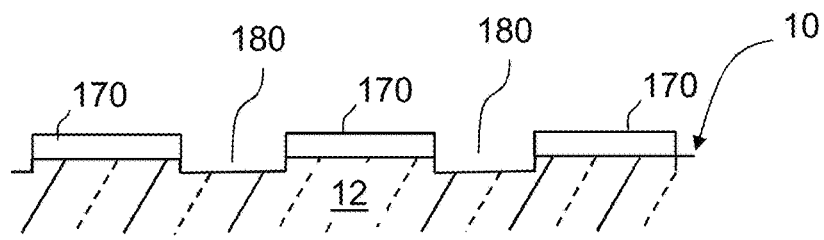
Figure 16F:
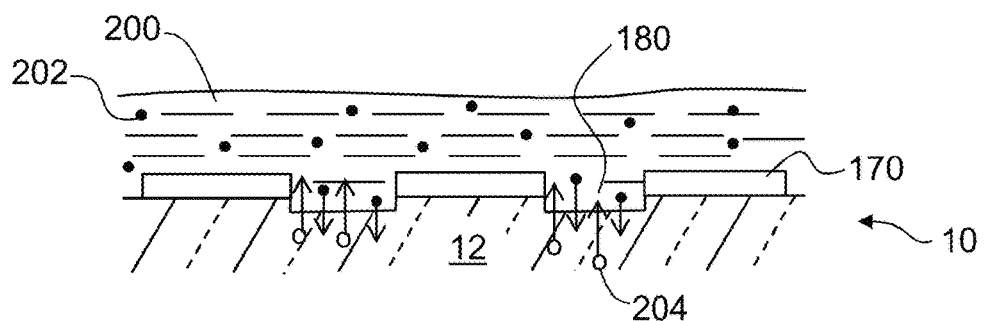
Figure 16G:
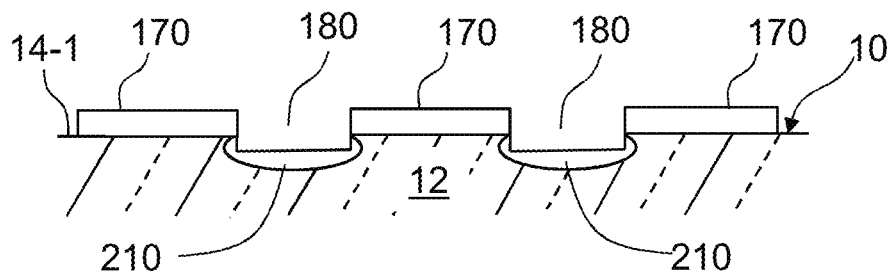
Figure 16H:
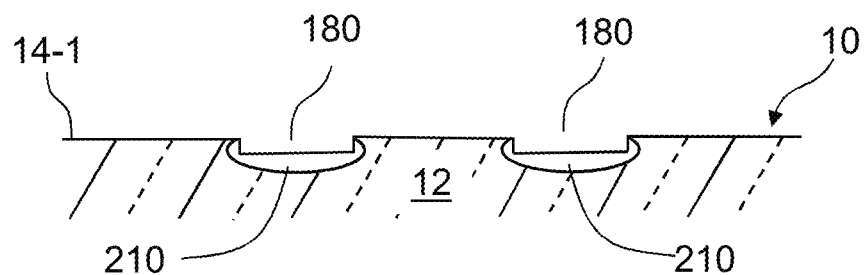

With reference now to FIG. 16D, the structure of FIG. 16C can be subjected to an etching process 130. As photomasking material 170 is resistant to etching, the etching process 130 etches into first surface 14-1 of the transparent medium 10 in spaces 171 between the remaining portions of photomasking material 170. The result, which is shown in FIG. 16E, is that depressions 180 are formed in the first surface 14-1 at the exposed locations where spaces 171 are located. The depressions 180 can be thought of as a valley V having relatively steep, substantially vertical sidewalls and the non-etched portions of the first surface 10 can be thought as a substantially flat (horizontal) peak P (see e.g., FIG. 12A). With reference now to FIG. 16F, an ion-exchange process can be performed where, for example, an ion-exchange liquid layer 200 is disposed on the structure of FIG. 16E. The ion-exchange liquid layer 200 can include ions 202 that are exchanged for other ions 204 in the body 12 of the transparent medium 10. For example, the ion-exchange process can be carried out at an elevated temperature, e.g., in a furnace or oven. The ion-exchange process acts to change the refractive index of transparent medium 10 in the locations where ions 202 and 204 are exchanged. Exemplary ions 202 in the ion-exchange liquid layer 200 include potassium and silver. Exemplary transparent mediums 10 can include glass. In some cases, it may be necessary to use an alternate or additional masking material that can be patterned by photoresist, where the alternate masking material acts as a durable diffusion barrier during high-temperature ion-exchange. Such durable masking materials can comprise various dense oxides and nitrides, such as silicon nitride, that may be deposited by known methods such as physical or chemical vapor deposition. With reference now to FIG. 16G, after the ion-exchange process is carried out, the resulting structure can include ion-exchanged regions 210 in the transparent medium body 12 adjacent the first surface 14-1 and aligned with the depressions 180. The ion-exchanged regions 210 can have a refractive index $n_2$ greater than the refractive index $n_1$ of the transparent medium body 12. With reference to FIG. 16H, the remaining photomasking material 170 is removed using known methods once the ion-exchange process is completed.

Figure 17A:
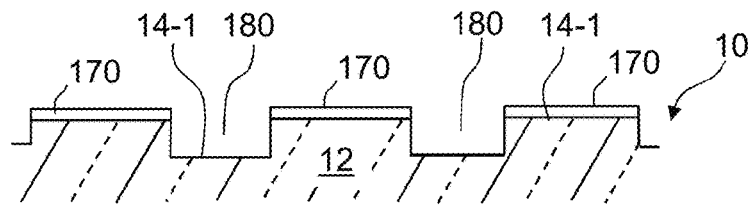
FIGS. 17A through 17D are simplified illustrations of embodiments of fabricating a structure where a high-index material is deposited in etched depressions.
Figure 17B:
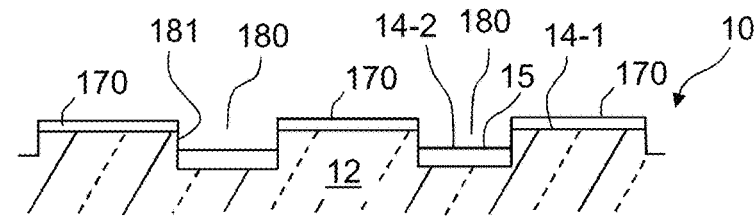
Figure 17C:
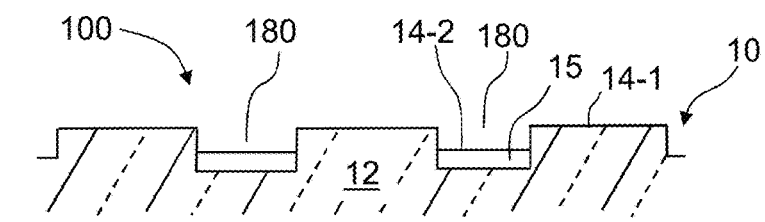
Figure 17D:
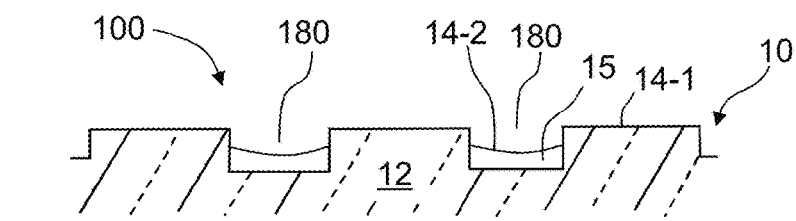

FIGS. 17A through 17D are simplified illustrations of embodiments of fabricating a structure where a high-index material is deposited in etched depressions. With reference to FIGS. 17A through 17D an additional exemplary method of fabricating a structure 100 similar to the example method shown in FIGS. 16A through 16H is provided. The exemplary method may follow the same steps as described above in connection with FIG. 16A through 16E to arrive at the structure of FIG. 17A, where depressions 180 are shown as being deeper than they are in FIG. 16E. In one non-limiting example, the depressions 180 can have substantially vertical sidewalls 181 and the first surface 14-1 can have substantially flat sections (see, e.g., FIG. 17A). In FIG. 17B, an optical distortion-reducing layer 15 can be deposited (by vapor- or liquid-based coating methods) within the depressions 180. With reference to FIG. 17C, the photomasking material 170 can be removed from the first surface 14-1 to form an exemplary structure 100. FIG. 17D is similar to FIG. 17C and shows an exemplary embodiment where instances of the layer 15 within the depressions 180 have a meniscus shape, which may be derived from the natural flow behavior of a liquid-based coating. In one example, the first surface 14-1 includes flat sections where photomasking material 170 resided.

Figure 18B:
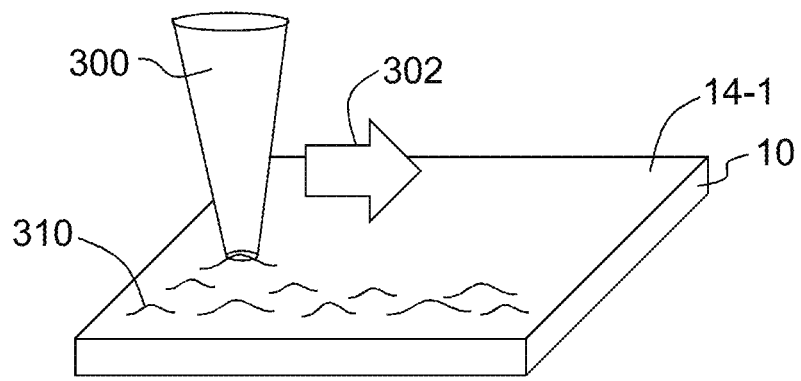
FIG. 18B is a perspective view of an exemplary transparent medium being processed by a laser beam to create glass bumps of various sizes illustrated in FIG. 18A.

FIG. 18A is a cross-sectional view of an exemplary transparent medium illustrating another embodiment of fabricating a structure by forming glass bumps on the surface of the transparent medium using localized heating with a pulsed laser. With reference to FIG. 18A, a transparent medium 10 is shown being irradiated with pulsed laser beams 300 having sufficient power to rapidly and locally heat the first surface 14-1. The first surface 14-1 of the transparent medium 10 can rapidly cool after application of the pulses of laser beams 300. The localized heating can cause localized softening and swelling of transparent medium 10 and, upon rapid cooling, regions of lower density or higher fictive temperature with a larger volume than the initial glass are frozen in place, thereby forming bumps 310 with peaks P. The sizes of the bumps 310 are proportional to the amount of heating provided to the first surface 14-1. The bumps 310 can thus define a textured surface 14-1, with the refractive index of the bumps 310 being lower than that of the unaffected body 12 of the transparent medium 10. The original planar surface 14-1 prior to the application of the localized heating is shown as a dashed line in the structure 100. Related materials and methods describing the formation of bumps 310 using localized heating and rapid cooling are disclosed in U.S. Pat. No. 7,480,432, entitled "Glass-based micropositioning systems and methods" and in U.S. Pat. No. 7,505,650, entitled "Microlenses for optical assemblies and related methods," the entirety of each being incorporated herein by reference. FIG. 18B is a perspective view of an exemplary transparent medium being processed by a laser beam to create glass bumps of various sizes illustrated in FIG. 18A. With reference to a transparent medium 10 is shown being processed by a laser beam 300 that, e.g., is scanned to different locations (as indicated by arrow 302) as its intensity is varied, thereby creating bumps 310 of various sizes such as shown in FIG. 18A.

Figure 19A:
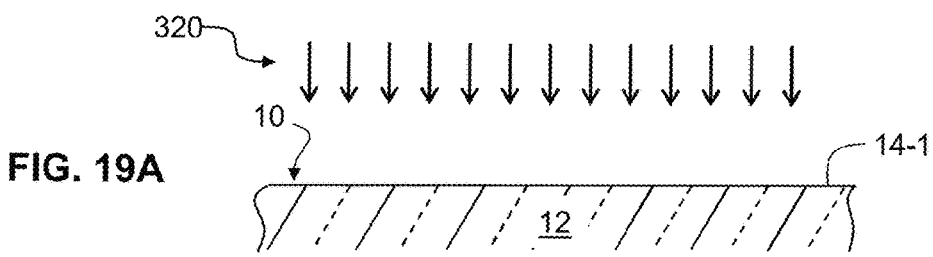
FIGS. 19A through 19F are simplified illustrations of embodiments of fabricating a structure using philic and phobic materials deposited on the transparent medium to form a phase structure.
Figure 19B:
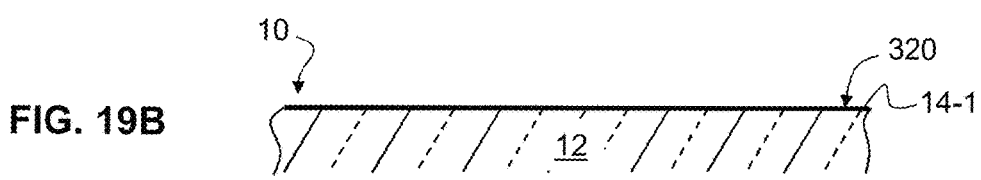
Figure 19C:
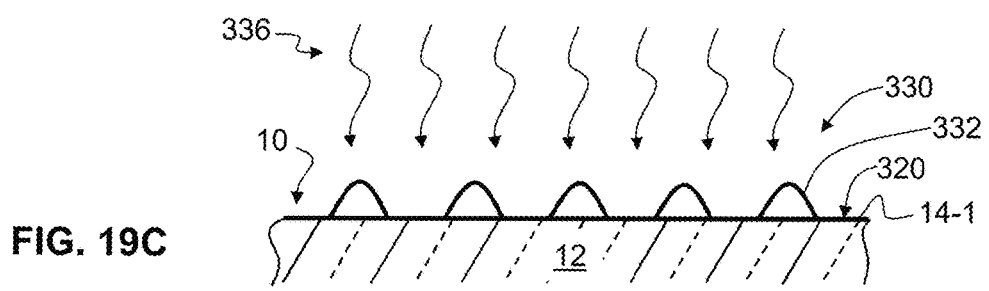
Figure 19D:
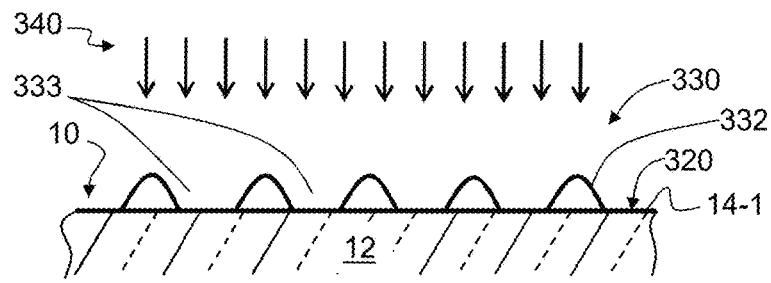
Figure 19E:
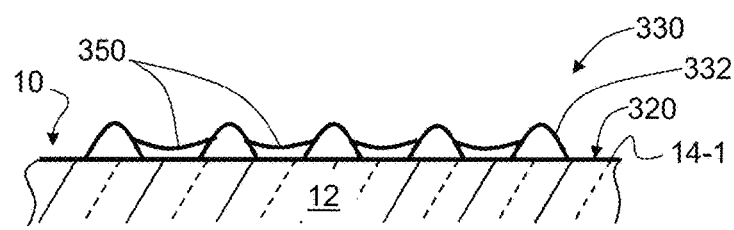
Figure 19F:
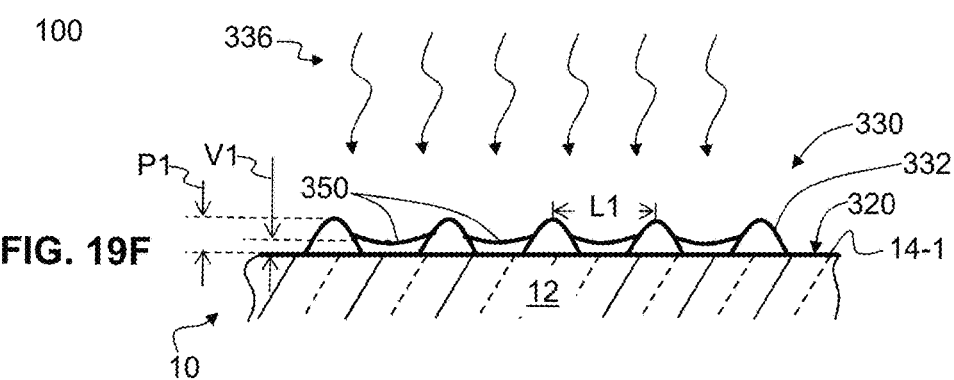

FIGS. 19A through 19F are simplified illustrations of embodiments of fabricating a DRAG structure using philic and phobic materials deposited on the transparent medium to form a phase structure. With reference to FIGS. 19A through 19F, another exemplary method of fabricating a structure 100 is provided. In FIGS. 19A and 19B, a first surface 14-1 is optionally treated with a phobic material 320 (illustrated by arrows in FIG. 19A) rendering the surface non-wetting (i.e., increases the liquid contact angle and prevents liquid spreading) relative to a low-index coating material. An exemplary, non-limiting phobic material 320 is fluorosilane. With reference to FIG. 19C, an ink-jet, stamping, dip-pen, or similar process can be used to form on the first surface 14-1 (and the thin layer of phobic material 320 thereon) an array 330 of low-index ($n_1$) droplets 332 approximately 10-100 microns in width and 0.1-5 microns in height. The droplets 332 are cured using, for example, UV or thermal curing, as illustrated in FIG. 19C in the form of curing energy 336. With reference now to FIG. 19D, the structure can be subjected to a philic treatment 340 (as indicated by arrows) rendering the exposed portions of surface 14-1 as well as droplets 332 more philic (i.e., more wettable), using, for example, a plasma, UV ozone, or a corona treatment. With reference to FIG. 19E, a final coating step can include depositing a high-index ($n_2$) coating 350, which may also be patterned using printing methods. Due to the wetting nature of spaces (valleys) 333 between droplets 332, the high-index coating 350 pools and wets the valleys 333 as shown. This can be followed by a final curing step as shown in FIG. 19F to form the final structure 100. FIG. 19F sets forth exemplary parameters that define the structure 100, such as lateral spacing between adjacent droplets 332 (peaks P), denoted L1, which may differ depending upon which droplets are being measured. Likewise, the peak height relative to substrate surface 14-1 is denoted P1 and the valley height relative to the substrate surface is denoted V1. In some cases, the low-index droplets 332 can be designed such that they retain some non-wetting behavior, enabling a simpler (e.g., complete coverage, non-patterned) wet coating process to be used when depositing high-index coating (material) 350. However, this may involve trade-offs between a lower-cost coating process and a possibly less ideal optical structure.

Non-limiting examples of low-index coating materials for forming droplets 332 include fluoroacrylates, which have a refractive index in the range from about 1.3 to about 1.35. Non-limiting examples of high-index coating materials include hybrid organic-inorganic polystyrenes, nanoparticle-filled acrylates, sol-gels, and certain polyimides, wherein the refractive index is in the range from about 1.6 to about 1.9 and even beyond. In some cases, one or both of the low-index and high-index materials can be filled with nanoparticles to modify their mechanical properties, shrinkage, or refractive index. Examples of nanoparticles that have been used to fill polymer systems include, but are not limited to, $SiO_2$ (low index) and $TiO_2$ or $ZrO_2$ (high index). Low-index-material regions can also include some amount of porosity or hollow regions, either in some degree or in part. For example, the low-index regions may comprise a nanoporous sol-gel material, a nanoporous polymer material, or hollow nanospheres or microspheres made from various glasses, polymers, or other materials mentioned herein or known in the art.

Figure 20A:
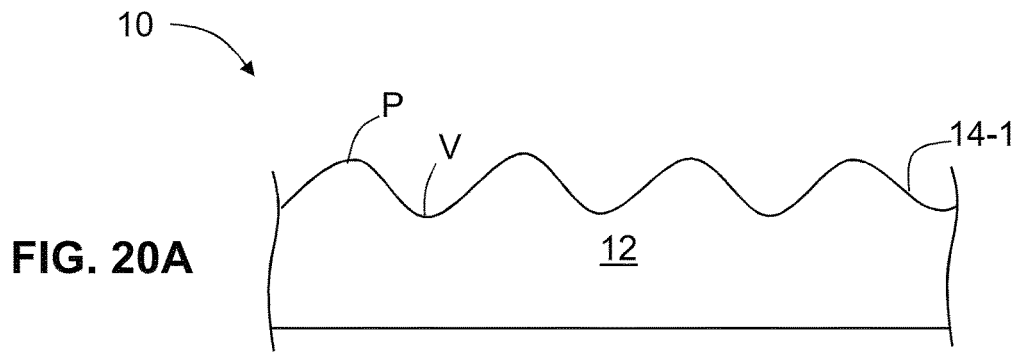
FIGS. 20A through 20C are simplified illustrations of further embodiments of fabricating a structure using preferential polishing of a conformal or semi-conformal layer.
Figure 20B:
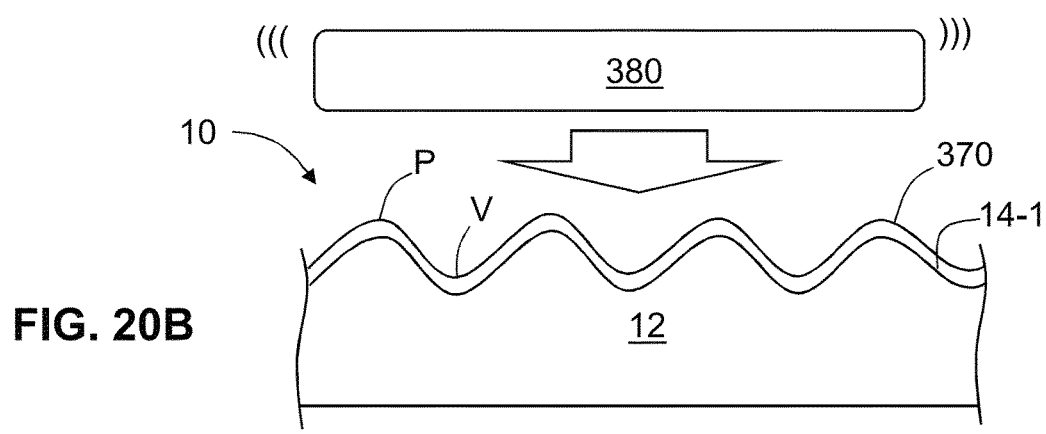
Figure 20C:
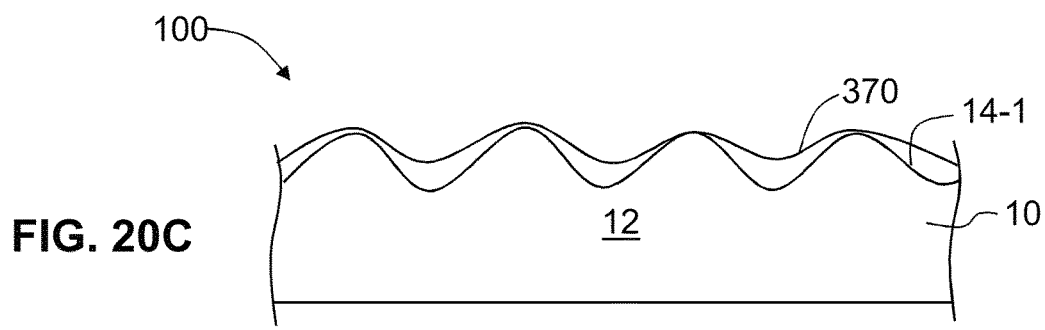

FIGS. 20A through 20C are simplified illustrations of further embodiments of fabricating a structure using preferential polishing of a conformal or semi-conformal layer. With reference to FIGS. 20A through 20C, another embodiment of fabricating structure 100 is provided. With reference to FIG. 20A, a glass substrate 10 is provided with a rough first surface 14-1 through any of the many known methods such as etching, embossing, hot-molding, sandblasting, and the like. The glass substrate 10 can then be coated with a conformal or semi-conformal high-index coating 370. The coating method can include, for example, vapor coating, such as thermal evaporation, e-beam evaporation, DC or AC sputtering, or CVD methods, to name a few. The coating method can also comprise liquid coating methods such as spin coating, dip coating, or spray coating. The coating material can be an inorganic, a sol-gel, or a polymer. The material for coating 370 can include TiO, $ZrO_2$, $Al_2O_3$, $SiO_2$, acrylate polymers, polyimides or other previously mentioned materials. After the conformal coating 370 has been applied to the rough surface 14-1 and optionally cured, a polishing step can be performed where a polishing pad 380 having a controlled softness or hardness (durometer) is selected. The polishing pad 380 can be brought into contact with the conformal coating 370 (as shown by the large arrow) and can be used to polish the structure using a controlled polishing pressure, so that peaks P of the structure in FIG. 20B are preferentially polished more than the valleys V. The polishing can be aided by a chemical agent, a liquid, an etching agent, or a particulate slurry. In this manner the high-index coating 370 becomes thinner at the peaks P and remains thicker in the valleys V, resulting in the structure 100 shown in FIG. 20C. In some embodiments, final target dimensions may be similar to those provided in previous examples. In an additional embodiment for forming a structure 100, polymer phase-separating materials can be employed to create the refractive-index (phase) variation that provides for both the distortion-reduction and AG properties as described above. Exemplary polymer phase-separating materials are known in the art and may be used in such embodiments.

One method of producing a phase separation involves the controlled use of humidity or water to form microdomains in a drying polymer solution to cause the final polymer to have a controlled microstructure (see, e.g., the article by Gliemann, et al., "Nanostructure formation in polymer thin films influenced by humidity," Surface and Interface Analysis 39, no. 1 (2007): 1-8k, the entirety of which is incorporated herein by reference) whereby the phase-separated water leaves voids in the final structure. Such polymers include PMMA and PVB, which may be used as the low-index peak material in the present disclosure, followed by an overcoating with a high-index material made to be thicker in valleys V of the structure using the previously described or other methods. A related alternative method involves the phase separation of two materials without significant water action. An exemplary system is the phase separation of $SiO_2$ and PMMA in a hybrid organic system starting from TEOS as a precursor to $SiO_2$ (see, e.g., the article by Silviera, et al., "Phase separation in PMMA/silica sol-gel systems," Polymer 36, no. 7 (1995): 1425-1434, the entirety of which is incorporated herein by reference).

In systems such as this with micron-scale separated phases, a solvent or an acid can be chosen that preferentially etches away the higher-index material, in this case PMMA, using plasma or an organic solvent. Plasma treatments and various solvents (e.g., acetone) will readily attack PMMA at a faster rate than they do $SiO_2$. Of course, this etching method is not limited to strictly "phase-separating" systems. A micro-domain structure can also be created, for example, by mechanically blending thermoplastic polymers at a high temperature. An exemplary system can be a blend of a fluoropolymer with a polyimide (or polyamide, polyester, polycarbonate, polyketone, or the like). Solvents can be readily found (e.g., certain ketones) that preferentially attack the higher index (non-flourinated) polymer in such a system, thus providing a route to create films or surfaces where the high-index material is selectively thinned relative to the low-index fluoropolymer material. See, e.g., U.S. Pat. No. 6,117,508 to Parsonage, et al., entitled "Composite articles including a fluoropolymer blend," the entirety of which is incorporated herein by reference.

In some embodiments, a light-transmitting structure is provided having a substrate having a plurality of regions where at least two of the plurality of regions have different refractive indices, and where an optical path length of light transmitted from a first light source through the plurality of regions is substantially constant, and where light transmitted from a second light source into the substrate is scattered by at least one of the plurality of regions. In some embodiments, the plurality of regions includes a first region, a second region and a third region, the second region intermediate the first and third regions. In other embodiments, one of the plurality of regions is on a surface of the substrate defining an interface to an ambient environment. In a non-limiting embodiment, the second region can have a light-scattering surface comprising a high index of refraction and a low index of refraction. In further embodiments, the second region includes particles (hollow or solid) having low indices of refraction and a filler or binder having a different index of refraction. In additional embodiments, the second region can include structured elements. In other embodiments, the structured elements are periodic, geometric, random, semi-random, non-periodic, prismatic or non-prismatic elements. Exemplary thickness of the structured elements in the optical path length can be less than about 0.05 microns, between about 0.05 microns to about 10 microns, between about 0.05 microns to about 50 microns, or between 50 microns and 100 microns. The refractive indices of each of the plurality of regions can be in the range of 1.0 to 2.5, from 1.0 to 1.3, from 1.0 to 2.0, or from 1.3 to 2.0. In some embodiments, light from the second light source can be scattered by the second region. In other embodiments, the second light source is selected from the group consisting of a light emitting diode (LED), an array of LEDs, and a laser. These second light sources can be edge or front lit sources. Exemplary structures include, but are not limited to, a transparent luminaire, transparent display, heads-up display, head-mounted display, transparent backlight, touch screen display, liquid-crystal display, aquarium, laser based reflective heads-up display, wearable display, window, vehicle dashboard, automotive window, waveguide, lightguide, or architectural window.

In additional embodiments, a light-transmitting structure includes a substrate having a plurality of regions, a first region being a structured region embedded in the substrate and a second region on a surface of the substrate defining an interface to an ambient environment. At least two of the plurality of regions have different refractive indices, and an optical path length of light transmitted from a first light source through the plurality of regions is substantially constant, and light transmitted from a second light source into the substrate is scattered by at least one of the plurality of regions. In some embodiments, the second region has a light-scattering surface comprising a high index of refraction and a low index of refraction. This second region can include particles having low indices of refraction and a filler or binder having a different index of refraction. In some embodiments, the first region can include structured elements. Exemplary structured elements are periodic, geometric, random, semi-random, non-periodic, prismatic or non-prismatic elements. Exemplary thicknesses of the structured elements in the optical path length are less than about 0.05 microns, between about 0.05 microns to about 10 microns, between about 0.05 microns to about 50 microns, or between 50 microns and 100 microns. In other embodiments, refractive indices of each of the plurality of regions can be in the range of 1.0 to 2.5, from 1.0 to 1.3, from 1.0 to 2.0, or from 1.3 to 2.0. The second light source can be, but is not limited to, a light emitting diode (LED), an array of LEDs, and a laser (edge lit or front lit). Exemplary structures include, but are not limited to, a transparent luminaire, transparent display, heads-up display, head-mounted display, transparent backlight, touch screen display, liquid-crystal display, aquarium, laser based reflective heads-up display, wearable display, window, vehicle dashboard, automotive window, waveguide, lightguide, or architectural window.

While this description can include many specifics, these should not be construed as limitations on the scope thereof, but rather as descriptions of features that can be specific to particular embodiments. Certain features that have been heretofore described in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and can even be initially claimed as such, one or more features from a claimed combination can in some cases be excised from the combination, and the claimed combination can be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing can be advantageous.

As shown by the various configurations and embodiments illustrated in FIGS. 1-24B, various embodiments for transparent diffusers for lightguides and luminaires have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A light-transmitting structure comprising:
a substrate having a plurality of regions, an x axis, a y axis and a z axis;
wherein at least two of the plurality of regions have different refractive indices, and
wherein optical path lengths of light transmitted from a first light source through the substrate in the z direction through the plurality of regions at a plurality of different spatial locations in the x and y direction is are substantially constant, and
wherein light transmitted from a second light source into the substrate is scattered by at least one of the plurality of regions;
wherein the different spatial locations in the x and y direction are within 1 cm of each other, wherein the substantially constant optical path lengths at the different spatial location are within ½λ of the light from the first light source.

2. The light-transmitting structure of claim 1 wherein the plurality of regions includes a first region, a second region and a third region, the second region intermediate the first and third regions.

3. The light transmitting structure of claim 2 wherein the second region has a light-scattering surface comprising a high index of refraction and a low index of refraction.

4. The light-transmitting structure of claim 2 wherein the second region includes particles having low indices of refraction and a filler or binder having a different index of refraction.

5. The light-transmitting structure of claim 4 wherein the particles are hollow or solid.

6. The light-transmitting structure of claim 2 wherein the second region includes structured elements.

7. The light-transmitting structure of claim 6 wherein the structured elements are periodic, geometric, random, semi-random, non-periodic, prismatic or non-prismatic elements.

8. The light-transmitting structure of claim 6 wherein the thickness of the structured elements in the optical path length are less than about 0.05 microns, between about 0.05 microns to about 10 microns, between about 0.05 microns to about 50 microns, or between 50 microns and 100 microns.

9. The light-transmitting structure of claim 2, wherein light from the second light source is scattered by the second region.

10. The light-transmitting structure of claim 1 wherein the second light source is selected from the group consisting of a light emitting diode (LED), an array of LEDs, and a laser.

11. The light-transmitting structure of claim 1 wherein the second light source provides an input to an edge of the structure or provides an input to the front of the structure.

12. The light-transmitting structure of claim 1 wherein the structure is a transparent luminaire, transparent display, heads-up display, head-mounted display, transparent backlight, touch screen display, liquid-crystal display, aquarium, laser based reflective heads-up display, wearable display, window, vehicle dashboard, automotive window, waveguide, lightguide, or architectural window.

13. The light transmitting structure of claim 1, wherein the light from the second light source is transmitted into the substrate from a direction different from the direction of light from the first light source.

14. The light transmitting structure of claim 1, wherein an area of a major surface of the substrate is greater than 4 cm$^2$.

15. The light-transmitting structure of claim 1 wherein one of the plurality of regions is on a surface of the substrate defining an interface to an ambient environment.

16. The light-transmitting structure of claim 1 wherein the refractive indices of each of the plurality of regions are in the range of 1.0 to 2.5, from 1.0 to 1.3, from 1.0 to 2.0, or from 1.3 to 2.0.

17. A light-transmitting structure comprising:
a substrate having a plurality of regions, a first region being a structured region embedded in the substrate and a second region on a surface of the substrate defining an interface to an ambient environment;
wherein at least two of the plurality of regions have different refractive indices, and
wherein optical path lengths of light transmitted from a first light source through the substrate and through the plurality of regions at adjacent spatial locations in an x-y plane of the structured region are substantially constant, and
wherein light transmitted from a second light source into the substrate is scattered by at least one of the plurality of regions;
wherein the adjacent spatial locations in the x and y direction are within 1 cm of each other, wherein the substantially constant optical path lengths at the adjacent spatial location are within ½λ of the light from the first light source.

18. The light transmitting structure of claim 17 wherein the second region has a light-scattering surface comprising a high index of refraction and a low index of refraction.

19. The light-transmitting structure of claim 17 wherein the first region includes structured elements comprising periodic, geometric, random, semi-random, non-periodic, prismatic or non-prismatic elements, and wherein the structured elements optionally comprise a thickness in the optical path length of less than about 0.05 microns, between about 0.05 microns to about 10 microns, between about 0.05 microns to about 50 microns, or between 50 microns and 100 microns.

20. The light-transmitting structure of claim 17 wherein the second light source is selected from the group consisting of a light emitting diode (LED), an array of LEDs, and a laser.

21. The light-transmitting structure of claim 17 wherein the second light source provides an input to an edge of the structure or provides an input to the front of the structure.

22. The light-transmitting structure of claim 17 wherein the structure is a transparent luminaire, transparent display, heads-up display, head-mounted display, transparent backlight, touch screen display, liquid-crystal display, aquarium, laser based reflective heads-up display, wearable display, window, vehicle dashboard, automotive window, waveguide, lightguide, or architectural window.

* * * * *